(12) United States Patent
Zhao et al.

(10) Patent No.: US 12,520,356 B2
(45) Date of Patent: Jan. 6, 2026

(54) INFORMATION TRANSMISSION METHOD, TERMINAL AND NETWORK DEVICE

(71) Applicant: DATANG MOBILE COMMUNICATIONS EQUIPMENT CO., LTD., Beijing (CN)

(72) Inventors: Yali Zhao, Beijing (CN); Da Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 585 days.

(21) Appl. No.: 17/920,016

(22) PCT Filed: Apr. 12, 2021

(86) PCT No.: PCT/CN2021/086616
§ 371 (c)(1),
(2) Date: Oct. 19, 2022

(87) PCT Pub. No.: WO2021/213206
PCT Pub. Date: Oct. 28, 2021

(65) Prior Publication Data
US 2023/0345558 A1 Oct. 26, 2023

(30) Foreign Application Priority Data

Apr. 20, 2020 (CN) .......................... 202010313407.5
Jul. 23, 2020 (CN) .......................... 202010718349.4

(51) Int. Cl.
*H04W 76/14* (2018.01)
*H04W 24/02* (2009.01)
(Continued)

(52) U.S. Cl.
CPC ............ *H04W 76/14* (2018.02); *H04W 24/02* (2013.01); *H04W 28/0268* (2013.01); *H04W 88/04* (2013.01)

(58) Field of Classification Search
CPC . H04W 76/14; H04W 24/02; H04W 28/0268; H04W 88/04; H04W 92/18;
(Continued)

(56) References Cited

U.S. PATENT DOCUMENTS

2017/0215224 A1* 7/2017 Ke .......................... H04W 76/32
2018/0167986 A1* 6/2018 Lin .......................... H04W 8/26
(Continued)

FOREIGN PATENT DOCUMENTS

| CN | 106162512 A | 11/2016 |
| CN | 107889080 A | 4/2018 |

(Continued)

OTHER PUBLICATIONS

Extended European search report from corresponding EPO Patent Application No. 21792818.3 dated Sep. 14, 2023.
(Continued)

*Primary Examiner* — Brian J. Gillis
*Assistant Examiner* — Thao D Duong
(74) *Attorney, Agent, or Firm* — Ladas & Parry, LLP

(57) ABSTRACT

An information transmission method, a terminal and a network device are provides. The method is applied to a second terminal and includes: determining a mapping relationship between a target object of a sidelink interface and a target object of a backhaul link; performing a relay function according to the mapping relationship; wherein the target object is one of a bearer, an RLC channel and an RLC layer logical channel; the second terminal is a relay terminal corresponding to a first terminal; the target object of the sidelink interface is a target object of a sidelink interface
(Continued)

between the first terminal and the second terminal; the target object of the backhaul link is a target object for carrying data and/or control information of the first terminal between the second terminal and a network device.

19 Claims, 16 Drawing Sheets

(51) Int. Cl.
*H04W 28/02* (2009.01)
*H04W 88/04* (2009.01)

(58) Field of Classification Search
CPC ............. H04W 28/02; H04W 72/1273; H04W 72/231; H04W 72/25; H04W 76/11; H04W 76/27
See application file for complete search history.

(56) References Cited

U.S. PATENT DOCUMENTS

| | | | |
|---|---|---|---|
| 2019/0387446 A1* | 12/2019 | Xu | H04W 36/0061 |
| 2020/0187042 A1* | 6/2020 | Pateromichelakis | H04W 28/24 |
| 2021/0195674 A1* | 6/2021 | Park | H04W 76/18 |
| 2023/0073469 A1* | 3/2023 | Wang | H04W 72/1263 |
| 2023/0397075 A1* | 12/2023 | Zhao | H04W 40/36 |

FOREIGN PATENT DOCUMENTS

| | | | |
|---|---|---|---|
| CN | 108391285 A | | 8/2018 |
| EP | 3322253 A1 | | 5/2018 |
| EP | 3562182 A1 | | 10/2019 |
| EP | 3579642 A1 | | 12/2019 |
| WO | 2017024453 A1 | | 2/2017 |
| WO | 2017099837 A1 | | 6/2017 |
| WO | 2018129875 A1 | | 7/2018 |

OTHER PUBLICATIONS

International Search Report for PCT Application PCT/CN2021/086616 issued on Jul. 2, 2021, and its English Translation provided by WIPO.
Written Opinion for PCT Application PCT/CN2021/086616 issued on Jul. 2, 2021, and its English Translation provided by WIPO.
Internationally Preliminary Report on Patentability for PCT/CN2021/086616 issued on Oct. 25, 2022, and English translation provided by WIPO.

* cited by examiner

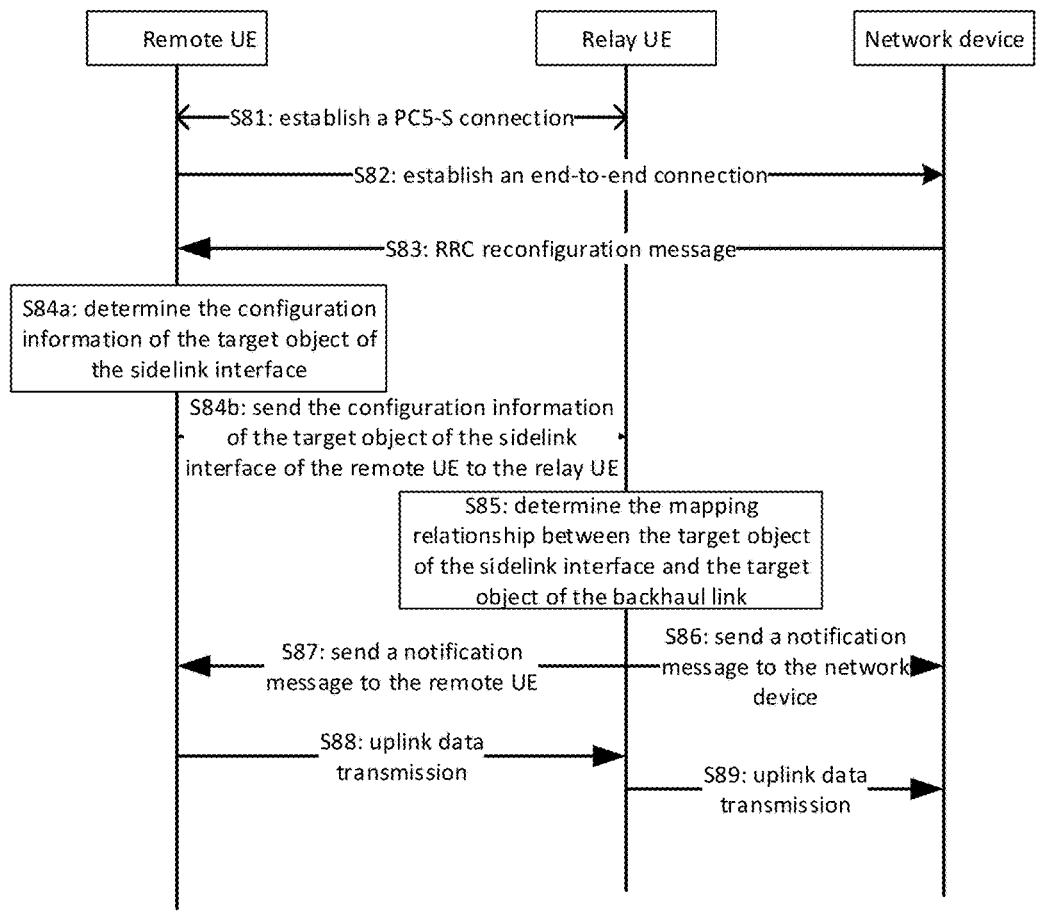

FIG. 8 receiving a mapping relationship between a target object of a sidelink interface sent by a second terminal and an end-to-end target object between the first terminal and a network device; or
receiving a mapping relationship among a target object of a backhaul link sent by the second terminal, the end-to-end target object between the first terminal and the network device, and the target object of the sidelink interface ⟍91

FIG. 9 receiving a mapping relationship between a target object of a backhaul link sent by a second terminal and an end-to-end target object between a first terminal and the network device; or
receiving a mapping relationship among the target object of the backhaul link sent by the second terminal, the end-to-end target object between the first terminal and the network device, and the target object of the sidelink interface; or
receiving a mapping relationship between the target object of the sidelink interface and the target object of the backhaul link sent by the second terminal; or
receiving a mapping relationship between the target object of the sidelink interface sent by the second terminal and the end-to-end target object between the first terminal and the network device;

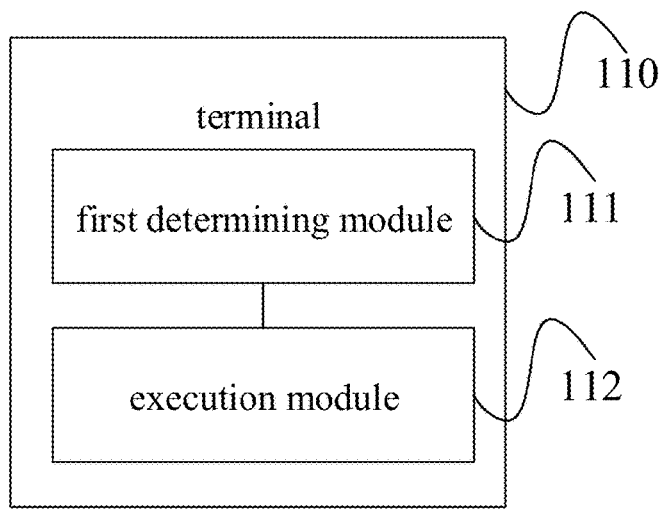

terminal first determining module 111 execution module 112

110

FIG. 11 receiving a mapping relationship between a target object of a sidelink interface and a target object of a backhaul link in an uplink direction sent by a first terminal

191 receiving a mapping relationship between a target object of a backhaul link in an uplink direction sent by a second terminal and an end-to-end target object between a first terminal and the network device; or receiving a mapping relationship among the target object of the backhaul link in the uplink direction sent by the second terminal, the end-to-end target object between the first terminal and the network device, and the target object of the sidelink interface; 201

FIG. 20

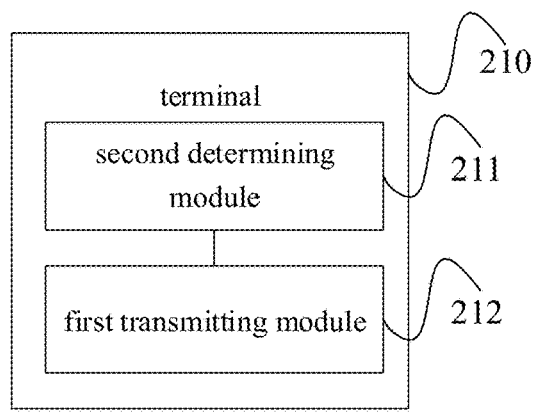

FIG. 21

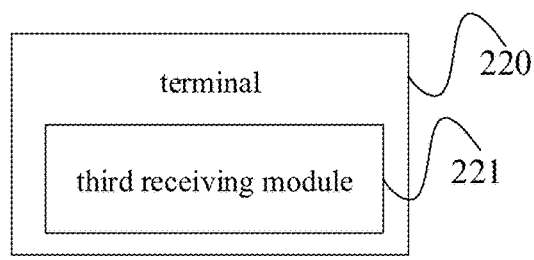

FIG. 22

INFORMATION TRANSMISSION METHOD, TERMINAL AND NETWORK DEVICE

CROSS-REFERENCE TO RELATED APPLICATIONS

This application is the U.S. national phase of PCT Application No. PCT/CN2021/086616 filed on Apr. 12, 2021, which claims priorities of to the Chinese patent application No. 202010313407.5 filed on Apr. 20, 2020, and the Chinese patent application No. 202010718349.4 filed on Jul. 23, 2020, the disclosures of which are incorporated herein by reference in their entireties.

TECHNICAL FIELD

The present disclosure relates to the field of communications technology, in particular to an information transmission method, a terminal and a network device.

BACKGROUND

In order to extend coverage, one solution is to introduce layer 2 (L2) relays. The L2 relay can be a terminal with a relay function.

For UE-to-Network Relay, the interface between the L2 relay and the network uses the interface between the terminal and the network (i.e., the Uu interface), the interface between the L2 relay and the relayed UE (referred to as the remote UE) uses a sidelink interface. The link between the L2 relay and the network may be referred to as a backhaul link for the remote UE.

For UE-to-UE Relay, the interfaces used between the L2 relay and the remote UE are all sidelink interfaces.

In the scenario where the UE serves as an L2 relay in the related art, there is no clear solution in the related art on how to implement the mapping between the two bearers (or the Radio Link Control (RLC) channels or the RLC layer logical channels) of the relay.

SUMMARY

Embodiments of the present disclosure provide an information transmission method, a terminal and a network device, so as to solve the problem in the related art that in the scenario where the UE serves as an L2 relay, there is no clear solution on how to implement the mapping between the two bearers or RLC channels or RLC layer logic channels of the relay, so as not to ensure the normal working of L2 relay.

In order to solve the problem, an embodiment of the present disclosure provides an information transmission method, applied to a second terminal, including: determining a mapping relationship between a target object of a sidelink interface and a target object of a backhaul link; performing a relay function according to the mapping relationship; wherein the target object is one of a bearer, a radio link control (RLC) channel and an RLC layer logical channel; the second terminal is a relay terminal corresponding to a first terminal; the target object of the sidelink interface is a target object of a sidelink interface between the first terminal and the second terminal; the target object of the backhaul link is a target object for carrying data and/or control information of the first terminal between the second terminal and a network device.

Optionally, for the mapping relationship between the target object of the sidelink interface and the target object of the backhaul link in a downlink direction, before determining the mapping relationship between the target object of the sidelink interface and the target object of the backhaul link, the method further includes: receiving configuration information of an end-to-end downlink target object between the first terminal and the network device sent by the first terminal or the network device.

Optionally, before determining the mapping relationship between the target object of the sidelink interface and the target object of the backhaul link, the method further includes: receiving identification information of the first terminal sent by the first terminal or the network device; wherein the identification information is configured by the network device for the first terminal.

Optionally, the identification information of the first terminal is a cell radio network temporary identification (C-RNTI) of the first terminal.

Optionally, after receiving the configuration information of the end-to-end downlink target object between the first terminal and the network device sent by the first terminal or the network device, the method further includes: determining configuration information of the target object of the sidelink interface corresponding to the end-to-end downlink target object between the first terminal and the network device.

Optionally, after determining the mapping relationship between the target object of the sidelink interface and the target object of the backhaul link, the method further includes: dividing a quality of service (QoS) parameter of the end-to-end downlink target object between the first terminal and the network device, between the target object of the sidelink interface and the target object of the backhaul link.

Optionally, after determining the mapping relationship between the target object of the sidelink interface and the target object of the backhaul link, the method further includes: transmitting a mapping relationship between the target object of the backhaul link in the downlink direction and the end-to-end target object between the first terminal and the network device to the network device; or transmitting a mapping relationship among the target object of the backhaul link in the downlink direction, the end-to-end target object between the first terminal and the network device, and the target object of the sidelink interface to the network device.

Optionally, the determining the mapping relationship between the target object of the sidelink interface and the target object of the backhaul link includes: if there is no downlink target object that meets a requirement on a backhaul link of a current Uu interface of the second terminal, transmitting, by the second terminal, a request message to the network device; wherein the request message is used to request the network device to reconfigure the target object of the backhaul link of the Uu interface in the downlink direction for the second terminal.

Optionally, before determining the mapping relationship between the target object of the sidelink interface and the target object of the backhaul link, the method further includes: receiving the mapping relationship between the end-to-end target object between the first terminal and the network device and the target object of the backhaul link sent by the network device.

Optionally, after determining the mapping relationship between the target object of the sidelink interface and the target object of the backhaul link, the method further includes: determining a QoS parameter of the target object of the sidelink interface according to the QoS parameter of the target object of the backhaul link configured by the network device.

Optionally, after determining the mapping relationship between the target object of the sidelink interface and the target object of the backhaul link, the method further includes: transmitting a mapping relationship between the target object of the sidelink interface and the target object of the backhaul link in the downlink direction to the network device; or, transmitting a mapping relationship between the target object of the sidelink interface in the downlink direction and the end-to-end target object between the first terminal and the network device to the network device; or transmitting a mapping relationship among the target object of the backhaul link in the downlink direction, the end-to-end target object between the first terminal and the network device, and the target object of the sidelink interface to the network device.

Optionally, after determining the mapping relationship between the target object of the sidelink interface and the target object of the backhaul link, the method further includes: transmitting a mapping relationship between the target object of the sidelink interface in the downlink direction and the end-to-end target object between the first terminal and the network device to the first terminal; or transmitting a mapping relationship among the target object of the backhaul link in the downlink direction, the end-to-end target object between the first terminal and the network device, and the target object of the sidelink interface to the first terminal.

Optionally, for the mapping relationship between the target object of the sidelink interface and the target object of the backhaul link in an uplink direction, before determining the mapping relationship between the target object of the sidelink interface and the target object of the backhaul link, the method further includes: receiving configuration information of an end-to-end uplink target object between the first terminal and the network device and configuration information of the target object of the sidelink interface sent by the first terminal.

Optionally, the determining the mapping relationship between the target object of the sidelink interface and the target object of the backhaul link includes: if there is no uplink target object that meets a requirement on the backhaul link of a current Uu interface of the second terminal, transmitting, by the second terminal, a request message to the network device; wherein the request message is used to request the network device to reconfigure the target object of the backhaul link of the Uu interface in the uplink direction for the second terminal.

Optionally, after determining the mapping relationship between the target object of the sidelink interface and the target object of the backhaul link, the method further includes: transmitting the mapping relationship between the target object of the backhaul link in the uplink direction and the end-to-end target object between the first terminal and the network device to the network device; or transmitting the mapping relationship among the target object of the backhaul link in the uplink direction, the end-to-end target object between the first terminal and the network device, and the target object of the sidelink interface to the network device.

Optionally, after determining the mapping relationship between the target object of the sidelink interface and the target object of the backhaul link, the method further includes: transmitting the mapping relationship between the target object of the sidelink interface in the uplink direction and the end-to-end target object between the first terminal and the network device to the first terminal; or transmitting the mapping relationship among the target object of the backhaul link in the uplink direction, the end-to-end target object between the first terminal and the network device, and the target object of the sidelink interface to the first terminal.

Optionally, before determining the mapping relationship between the target object of the sidelink interface and the target object of the backhaul link, the method further includes: receiving a sidelink interface PC5-S connection establishment request sent by the first terminal, and establishing a PC5-S connection with the first terminal.

Optionally, the establishing the PC5-S connection comprises one of the following: establishing the PC5-S connection using a PC5-S message dedicated to a relay system; or, adding indication information to the PC5-S connection establishment request message, wherein the indication information is used to indicate that a purpose of establishing the PC5-S connection is to request the second terminal to serve as a relay from the first terminal to the network device.

Optionally, before determining the mapping relationship between the target object of the sidelink interface and the target object of the backhaul link, the method further includes: determining that data and/or control information of the first terminal are transmitted on the backhaul link using a default target object of the backhaul link.

An embodiment of the present disclosure provides an information transmission method, applied to a first terminal, including: receiving a mapping relationship between a target object of a sidelink interface and an end-to-end target object between the first terminal and a network device sent by a second terminal; or receiving a mapping relationship among a target object of a backhaul link, the end-to-end target object between the first terminal and the network device, and the target object of the sidelink interface sent by the second terminal; wherein the target object is one of a bearer, a radio link control (RLC) channel and a RLC layer logical channel; the target object of the sidelink interface is a target object of a sidelink interface between the first terminal and the second terminal; the target object of the backhaul link is a target object for carrying data and/or control information of the first terminal between the second terminal and the network device; the mapping relationship is a mapping relationship in an uplink direction or an downlink direction; the second terminal is a relay terminal corresponding to the first terminal.

Optionally, the information transmission method further includes: receiving an end-to-end radio resource control (RRC) reconfiguration signaling sent by the network device through the second terminal; obtaining configuration information of the end-to-end target object between the first terminal and the network device through the RRC reconfiguration signaling; transmitting the configuration information of the end-to-end target object between the first terminal and the network device to the second terminal; wherein the configuration information of the end-to-end target object includes configuration information of an uplink target object or configuration information of a downlink target object.

Optionally, the RRC reconfiguration signaling carries identification information of the first terminal.

Optionally, when the configuration information of the end-to-end target object is the configuration information of the downlink target object, after obtaining the configuration information of the end-to-end target object between the first terminal and the network device through the RRC reconfiguration signaling, the method further includes: transmitting the identification information of the first terminal to the second terminal.

Optionally, the identification information of the first terminal is a cell radio network temporary identification (C-RNTI) of the first terminal.

Optionally, when the configuration information of the end-to-end target object is the configuration information of the uplink target object, after obtaining the configuration information of the end-to-end target object between the first terminal and the network device through the RRC reconfiguration signaling, the method further includes: determining configuration information of the target object of the sidelink interface corresponding to the end-to-end target object between the first terminal and the network device in the uplink direction; transmitting the configuration information of the target object of the sidelink interface to the second terminal.

Optionally, after determining the configuration information of the target object of the sidelink interface corresponding to the end-to-end target object between the first terminal and the network device in the uplink direction, the method further includes: dividing a QoS parameter of an end-to-end uplink target object between the first terminal and the network device, between the target object of the sidelink interface and the target object of the backhaul link.

An embodiment of the present disclosure provides an information transmission method, applied to a network device, including: receiving a mapping relationship between a target object of a backhaul link and an end-to-end target object between a first terminal and the network device sent by a second terminal; or receiving a mapping relationship among the target object of the backhaul link, the end-to-end target object between the first terminal and the network device, and the target object of the sidelink interface sent by the second terminal; or receiving a mapping relationship between the target object of the sidelink interface and the target object of the backhaul link sent by the second terminal; or receiving a mapping relationship between the target object of the sidelink interface and the end-to-end target object between the first terminal and the network device sent by the second terminal; wherein, the target object is one of a bearer, a radio link control (RLC) channel and a RLC layer logical channel; the target object of the sidelink interface is a target object of a sidelink interface between the first terminal and the second terminal; the target object of the backhaul link is a target object for carrying data and/or control information of the first terminal between the second terminal and the network device; the mapping relationship is a mapping relationship in an uplink direction or an downlink direction; the second terminal is a relay terminal corresponding to the first terminal.

Optionally, the information transmission method further includes: transmitting an end-to-end RRC reconfiguration signaling to the first terminal through the second terminal; wherein the RRC reconfiguration signaling includes: configuration information of the end-to-end target object between the first terminal and the network device.

Optionally, the RRC reconfiguration signaling carries identification information of the first terminal.

Optionally, when the mapping relationship is the mapping relationship in the downlink direction, the method further includes: transmitting the mapping relationship between the end-to-end target object between the first terminal and the network device and the target object of the backhaul link to the second terminal.

An embodiment of the present disclosure provides an information transmission method, applied to a first terminal, including: determining a mapping relationship between a target object of a sidelink interface and a target object of a backhaul link in an uplink direction; transmitting the mapping relationship to a second terminal; wherein the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and a network device; the second terminal is a relay terminal corresponding to the first terminal.

Optionally, before the determining the mapping relationship between the target object of the sidelink interface and the target object of the backhaul link in the uplink direction, the method further includes: receiving, through the second terminal, an end-to-end radio resource control (RRC) reconfiguration signaling sent by the network device; wherein the RRC reconfiguration signaling includes: configuration information of the end-to-end target object between the first terminal and the network device.

Optionally, the RRC reconfiguration signaling carries identification information of the first terminal.

Optionally, the identification information of the first terminal is a cell radio network temporary identification (C-RNTI) of the first terminal.

Optionally, before determining the mapping relationship between the target object of the sidelink interface and the target object of the backhaul link in the uplink direction, the method further includes: receiving configuration information of the target object of the backhaul link sent by the second terminal.

Optionally, before determining the mapping relationship between the target object of the sidelink interface and the target object of the backhaul link in the uplink direction, the method further includes: determining configuration information of the target object of the sidelink interface corresponding to the end-to-end target object between the first terminal and the network device in the uplink direction.

Optionally, after determining the configuration information of the target object of the sidelink interface corresponding to the end-to-end target object between the first terminal and the network device in the uplink direction, the method further includes: transmitting the configuration information of the target object of the sidelink interface to the second terminal.

Optionally, after the determining the mapping relationship between the target object of the sidelink interface and the target object of the backhaul link in the uplink direction, the method further includes: determining a QoS parameter of the target object of the sidelink interface according to a QoS parameter of the end-to-end target object between the first terminal and the network device and a QoS parameter of the target object of the backhaul link.

Optionally, after the determining the mapping relationship between the target object of the sidelink interface and the target object of the backhaul link in the uplink direction, the method further includes: transmitting a mapping relationship between the target object of the backhaul link in the uplink direction and the end-to-end target object between the first terminal and the network device to the network device and/or the second terminal; or transmitting a mapping relationship among the target object of the backhaul link in the uplink direction, the end-to-end target object between the first terminal and the network device, and the target object of the sidelink interface to the network device and/or second terminal.

Optionally, before the determining the mapping relationship between the target object of the sidelink interface and the target object of the backhaul link in the uplink direction, the method further includes: establishing a sidelink interface PC5-S connection with the second terminal.

Optionally, the establishing a PC5-S connection comprises one of the following: establishing the PC5-S connection using a PC5-S message dedicated to a relay system; or, adding indication information to a PC5-S connection establishment request message, wherein the indication information is used to indicate that a purpose of establishing the PC5-S connection is to request the second terminal to serve as a relay from the first terminal to the network device.

An embodiment of the present disclosure provides an information transmission method, applied to a second terminal, including: receiving a mapping relationship between a target object of a sidelink interface and a target object of a backhaul link in an uplink direction sent by a first terminal; wherein, the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and a network device; the second terminal is a relay terminal corresponding to the first terminal.

Optionally, the information transmission further includes: receiving configuration information of the target object of the sidelink interface corresponding to an end-to-end target object between the first terminal and the network device in the uplink direction sent by the first terminal.

Optionally, before receiving the mapping relationship between the target object of the sidelink interface and the target object of the backhaul link in the uplink direction sent by the first terminal, the method further includes: receiving a mapping relationship between the end-to-end target object between the first terminal and the network device and the target object of the backhaul link, and the configuration information of the target object of the backhaul link sent by the network device.

Optionally, after receiving the mapping relationship between the end-to-end target object between the first terminal and the network device and the target object of the backhaul link and the configuration information of the target object of the backhaul link sent by the network device, the method also includes: transmitting configuration information of the target object of the backhaul link to the first terminal.

Optionally, before receiving the mapping relationship between the target object of the sidelink interface and the target object of the backhaul link in the uplink direction sent by the first terminal, the method further includes: determining that data and/or control information of the first terminal is transmitted on the backhaul link using a default target object of the backhaul link.

An embodiment of the present disclosure provides an information transmission method, applied to a network device, including: receiving a mapping relationship between a target object of a backhaul link in an uplink direction and an end-to-end target object between a first terminal and the network device sent by a second terminal; or receiving a mapping relationship among the target object of the backhaul link in the uplink direction, an end-to-end target object between the first terminal and the network device, and a target object of a sidelink interface sent by the second terminal; wherein the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and the network device; the second terminal is a relay terminal corresponding to the first terminal.

Optionally, the information transmission method further includes: transmitting an end-to-end radio resource control (RRC) reconfiguration signaling to the first terminal through the second terminal; wherein the RRC reconfiguration signaling includes: configuration information of the end-to-end target object between the first terminal and the network device.

Optionally, the RRC reconfiguration signaling carries identification information of the first terminal.

Optionally, the information transmission method further includes: transmitting a mapping relationship between the end-to-end target object between the first terminal and the network device and the target object of the backhaul link, and configuration information of the target object of the backhaul link to the second terminal.

An embodiment of the present disclosure provides an information transmission method, applied to a second terminal, including: determining a mapping relationship between a target object of a first sidelink interface and a target object of a second sidelink interface; performing information transmission between a first terminal and a third terminal according to the mapping relationship; wherein the target object is one of a bearer, a radio link control (RLC) channel and an RLC layer logical channel; the second terminal is a relay terminal for communication between the first terminal and the third terminal; the target object of the first sidelink interface is a target object of a sidelink interface between the first terminal and the second terminal; the target object of the second sidelink interface is a target object of a sidelink interface between the second terminal and the third terminal.

Optionally, before the determining the mapping relationship between the target object of the first sidelink interface and the target object of the second sidelink interface, the method further includes: receiving configuration information of an end-to-end target object between the first terminal and the third terminal and configuration information of the target object of the first sidelink interface sent by the first terminal; determining configuration information of the target object of the second sidelink interface according to the configuration information of the end-to-end target object and configuration information of the target object of the first sidelink interface.

An embodiment of the present disclosure provides an information transmission method, applied to a first terminal, including: determining configuration information of an end-to-end target object between the first terminal and a third terminal; determining configuration information of a target object of a first sidelink interface according to the configuration information of the end-to-end target object; transmitting the configuration information of the end-to-end target object between the first terminal and the third terminal and the configuration information of the target object of the first sidelink interface to a second terminal; wherein, the target object is one of a bearer, a radio link control (RLC) channel and an RLC layer logical channel; the target object of the first sidelink interface is a target object of a sidelink interface between the first terminal and the second terminal; the second terminal is a relay terminal for communication between the first terminal and the third terminal.

Optionally, after determining the configuration information of the target object of the first sidelink interface according to the configuration information of the end-to-end target object, the method further includes: dividing a QoS parameter of an end-to-end target object between the first terminal and the third terminal, between the target object of the first sidelink interface and a target object of a second sidelink interface; wherein the target object of the second sidelink interface is a target object of a sidelink interface between the second terminal and the third terminal.

An embodiment of the present disclosure provides a terminal, being a second terminal, including: a memory, a processor, and a program stored on the memory and executed by the processor; the processor executes the program to implement the following steps: determining a mapping relationship between a target object of a sidelink interface and a target object of a backhaul link; performing a relay function according to the mapping relationship; wherein the target object is one of a bearer, a radio link control (RLC) channel and an RLC layer logical channel; the second terminal is a relay terminal corresponding to a first terminal; the target object of the sidelink interface is a target object of a sidelink interface between the first terminal and the second terminal; the target object of the backhaul link is a target object for carrying data and/or control information of the first terminal between the second terminal and a network device.

An embodiment of the present disclosure provides a terminal, being a first terminal, including: a memory, a processor, and a program stored on the memory and executed by the processor; the processor executes the program to implement the following steps: receiving a mapping relationship between a target object of a sidelink interface and an end-to-end target object between the first terminal and a network device sent by a second terminal; or receiving a mapping relationship among a target object of a backhaul link, the end-to-end target object between the first terminal and the network device, and the target object of the sidelink interface sent by the second terminal; wherein the target object is one of a bearer, a radio link control (RLC) channel and a RLC layer logical channel; the target object of the sidelink interface is a target object of a sidelink interface between the first terminal and the second terminal; the target object of the backhaul link is a target object for carrying data and/or control information of the first terminal between the second terminal and the network device; the mapping relationship is a mapping relationship in an uplink direction or an downlink direction; the second terminal is a relay terminal corresponding to the first terminal.

An embodiment of the present disclosure provides a network device, including: a memory, a processor, and a program stored on the memory and executed by the processor; the processor executes the program to implement the following steps: receiving a mapping relationship between a target object of a backhaul link and an end-to-end target object between a first terminal and the network device sent by a second terminal; or receiving a mapping relationship among the target object of the backhaul link, the end-to-end target object between the first terminal and the network device, and the target object of the sidelink interface sent by the second terminal; or receiving a mapping relationship between the target object of the sidelink interface and the target object of the backhaul link sent by the second terminal; or receiving a mapping relationship between the target object of the sidelink interface and the end-to-end target object between the first terminal and the network device sent by the second terminal; wherein, the target object is one of a bearer, a radio link control (RLC) channel and a RLC layer logical channel; the target object of the sidelink interface is a target object of a sidelink interface between the first terminal and the second terminal; the target object of the backhaul link is a target object for carrying data and/or control information of the first terminal between the second terminal and the network device; the mapping relationship is a mapping relationship in an uplink direction or an downlink direction; the second terminal is a relay terminal corresponding to the first terminal.

An embodiment of the present disclosure provides a terminal, being a first terminal, including: a memory, a processor, and a program stored on the memory and executed by the processor; the processor executes the program to implement the following steps: determining a mapping relationship between a target object of a sidelink interface and a target object of a backhaul link in an uplink direction; transmitting the mapping relationship to a second terminal; wherein the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and a network device; the second terminal is a relay terminal corresponding to the first terminal.

An embodiment of the present disclosure provides a terminal, being a second terminal, including: a memory, a processor, and a program stored on the memory and executed by the processor; the processor executes the program to implement the following step: receiving a mapping relationship between a target object of a sidelink interface and a target object of a backhaul link in an uplink direction sent by a first terminal; wherein, the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and a network device; the second terminal is a relay terminal corresponding to the first terminal.

An embodiment of the present disclosure provides a network device, including: a memory, a processor, and a program stored on the memory and executed by the processor; the processor executes the program to implement the following steps: receiving a mapping relationship between a target object of a backhaul link in an uplink direction and an end-to-end target object between a first terminal and the network device sent by a second terminal; or receiving a mapping relationship among the target object of the backhaul link in the uplink direction, an end-to-end target object between the first terminal and the network device, and a target object of a sidelink interface sent by the second terminal; wherein the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and the network device; the second terminal is a relay terminal corresponding to the first terminal.

An embodiment of the present disclosure provides a terminal, being a second terminal, including: a memory, a processor, and a program stored on the memory and executed by the processor; the processor executes the program to implement the following steps: determining a mapping relationship between a target object of a first sidelink interface and a target object of a second sidelink interface; performing information transmission between a first terminal and a third terminal according to the mapping relationship; wherein the target object is one of a bearer, a radio link control (RLC) channel and an RLC layer logical channel; the second terminal is a relay terminal for communication between the first terminal and the third terminal; the target object of the first sidelink interface is a target object of a sidelink interface between the first terminal and the second terminal; the target object of the second sidelink interface is a target object of a sidelink interface between the second terminal and the third terminal.

An embodiment of the present disclosure provides a terminal, being a first terminal, including: a memory, a processor, and a program stored on the memory and executed by the processor; the processor executes the program to implement the following steps: determining configuration information of an end-to-end target object between the first terminal and a third terminal; determining configuration information of a target object of a first sidelink interface according to the configuration information of the end-to-end target object; transmitting the configuration information of the end-to-end target object between the first terminal and the third terminal and the configuration information of the target object of the first sidelink interface to a second terminal; wherein, the target object is one of a bearer, a radio link control (RLC) channel and an RLC layer logical channel; the target object of the first sidelink interface is a target object of a sidelink interface between the first terminal and the second terminal; the second terminal is a relay terminal for communication between the first terminal and the third terminal.

An embodiment of the present disclosure provides a computer-readable storage medium having a computer program stored thereon, wherein the computer program is executed by a processor to implement the information transmission method.

An embodiment of the present disclosure provides a terminal, being a second terminal, including: a first determining module, configured to determine a mapping relationship between a target object of a sidelink interface and a target object of a backhaul link; an execution module, configured to perform a relay function according to the mapping relationship; wherein the target object is one of a bearer, a radio link control (RLC) channel and an RLC layer logical channel; the second terminal is a relay terminal corresponding to a first terminal; the target object of the sidelink interface is a target object of a sidelink interface between the first terminal and the second terminal; the target object of the backhaul link is a target object for carrying data and/or control information of the first terminal between the second terminal and a network device.

An embodiment of the present disclosure provides a terminal, being a first terminal, including: a first receiving module, configured to receive a mapping relationship between a target object of a sidelink interface and an end-to-end target object between the first terminal and a network device sent by a second terminal; or receive a mapping relationship among a target object of a backhaul link, the end-to-end target object between the first terminal and the network device, and the target object of the sidelink interface sent by the second terminal; wherein the target object is one of a bearer, a radio link control (RLC) channel and a RLC layer logical channel; the target object of the sidelink interface is a target object of a sidelink interface between the first terminal and the second terminal; the target object of the backhaul link is a target object for carrying data and/or control information of the first terminal between the second terminal and the network device; the mapping relationship is a mapping relationship in an uplink direction or an downlink direction; the second terminal is a relay terminal corresponding to the first terminal.

An embodiment of the present disclosure provides a network device, including: a second receiving module, configured to receive a mapping relationship between a target object of a backhaul link and an end-to-end target object between a first terminal and the network device sent by a second terminal; or receive a mapping relationship among the target object of the backhaul link, the end-to-end target object between the first terminal and the network device, and the target object of the sidelink interface sent by the second terminal; or receive a mapping relationship between the target object of the sidelink interface and the target object of the backhaul link sent by the second terminal; or receive a mapping relationship between the target object of the sidelink interface and the end-to-end target object between the first terminal and the network device sent by the second terminal; wherein, the target object is one of a bearer, a radio link control (RLC) channel and a RLC layer logical channel; the target object of the sidelink interface is a target object of a sidelink interface between the first terminal and the second terminal; the target object of the backhaul link is a target object for carrying data and/or control information of the first terminal between the second terminal and the network device; the mapping relationship is a mapping relationship in an uplink direction or an downlink direction; the second terminal is a relay terminal corresponding to the first terminal.

An embodiment of the present disclosure provides a terminal, being a first terminal, including: a second determining module, configured to a mapping relationship between a target object of a sidelink interface and a target object of a backhaul link in an uplink direction; a first transmitting module, configured to transmit the mapping relationship to a second terminal; wherein the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and a network device; the second terminal is a relay terminal corresponding to the first terminal.

An embodiment of the present disclosure provides a terminal, being a second terminal, including: a third receiving module, configured to receive a mapping relationship between a target object of a sidelink interface and a target object of a backhaul link in an uplink direction sent by a first terminal; wherein, the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and a network device; the second terminal is a relay terminal corresponding to the first terminal.

An embodiment of the present disclosure provides a network device, including: a fourth receiving module, configured to receive a mapping relationship between a target object of a backhaul link in an uplink direction and an end-to-end target object between a first terminal and the network device sent by a second terminal; or receive a mapping relationship among the target object of the backhaul link in the uplink direction, an end-to-end target object between the first terminal and the network device, and a target object of a sidelink interface sent by the second terminal; wherein the target object is one of a bearer, a radio link control (RLC) channel and an RLC layer logical channel; the target object of the sidelink interface is a target object of a sidelink interface between the first terminal and the second terminal; the target object of the backhaul link is a target object for carrying data and/or control information of the first terminal between the second terminal and the network device; the second terminal is a relay terminal corresponding to the first terminal.

An embodiment of the present disclosure provides a terminal, being a second terminal, including: a third determining module, configured to determine a mapping relationship between a target object of a first sidelink interface and a target object of a second sidelink interface; a transmission module, configured to perform information transmission between a first terminal and a third terminal according to the mapping relationship; wherein the target object is one of a bearer, a radio link control (RLC) channel and an RLC layer logical channel; the second terminal is a relay terminal for communication between the first terminal and the third terminal; the target object of the first sidelink interface is a target object of a sidelink interface between the first terminal and the second terminal; the target object of the second sidelink interface is a target object of a sidelink interface between the second terminal and the third terminal.

An embodiment of the present disclosure provides a terminal, being a first terminal, including: a fourth determining module, configured to determine configuration information of an end-to-end target object between the first terminal and a third terminal; a fifth determining module, configured to determine configuration information of a target object of a first sidelink interface according to the configuration information of the end-to-end target object; a second transmitting module, configured to transmit the configuration information of the end-to-end target object between the first terminal and the third terminal and the configuration information of the target object of the first sidelink interface to a second terminal; wherein, the target object is one of a bearer, a radio link control (RLC) channel and an RLC layer logical channel; the target object of the first sidelink interface is a target object of a sidelink interface between the first terminal and the second terminal; the second terminal is a relay terminal for communication between the first terminal and the third terminal.

The beneficial effect of the present disclosure is as follows.

In the above solution, the relay terminal or the remote terminal determine the mapping relationship between two bearers or RLC channels or RLC layer logic channels, so as to ensure the normal work of the L2 relay and improve the reliability of the network communication.

BRIEF DESCRIPTION OF THE DRAWINGS

FIG. 8 shows yet another detailed flowchart of the implementation of the embodiment of the present disclosure;

FIG. 9 shows another schematic flowchart of an information transmission method according to an embodiment of the present disclosure;

FIG. 10 shows yet another schematic flowchart of the information transmission method according to the embodiment of the present disclosure;

FIG. 11 shows a schematic diagram of the modules of a terminal according to the embodiment of the present disclosure;

FIG. 20 shows yet another schematic flowchart of the information transmission method according to the embodiment of the present disclosure;

FIG. 21 shows ye another schematic diagram of the modules of the terminal according to the embodiment of the present disclosure;

FIG. 22 shows yet another schematic diagram of the modules of the terminal according to the embodiment of the present disclosure;

DETAILED DESCRIPTION

In order to make the objectives, technical solutions and advantages of the present disclosure clearer, the present disclosure will be described in detail below with reference to the accompanying drawings and specific embodiments.

First, some concepts related to the embodiments of the present disclosure are described as follows.

1. Cellular Network Communication

Figure 1:
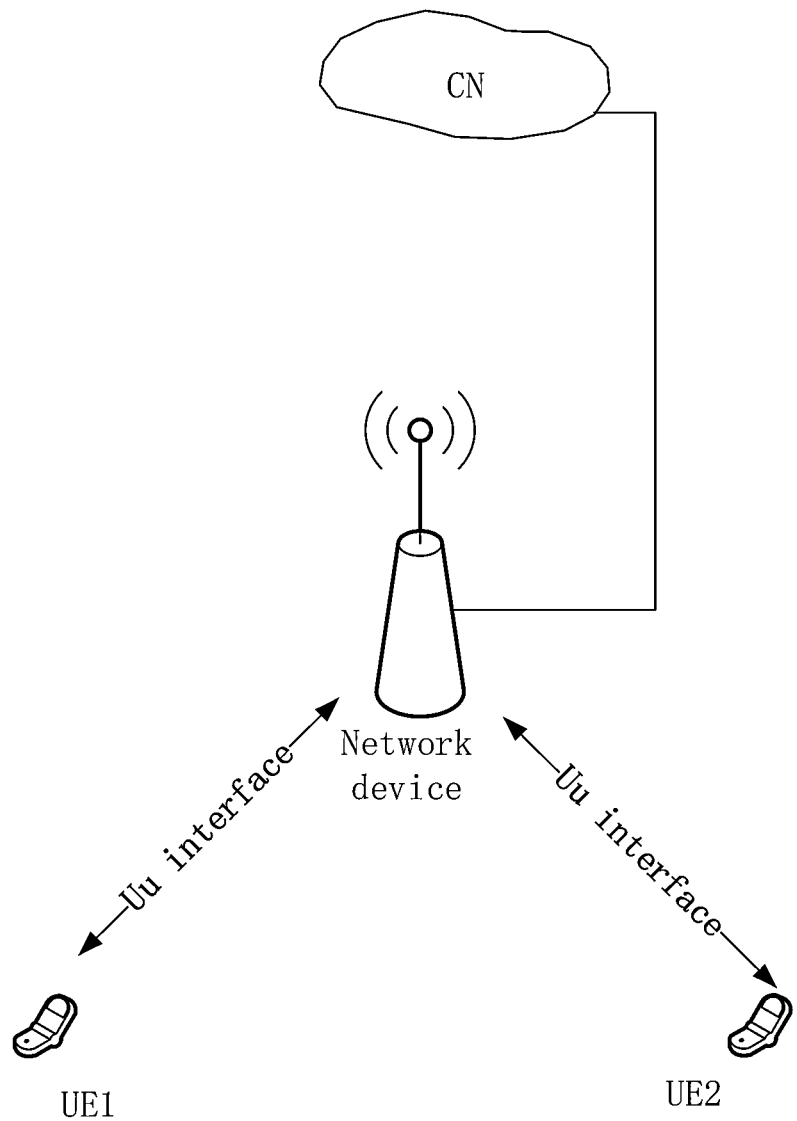
FIG. 1 shows a schematic diagram of cellular network communication.

The wireless communication in the related art is performed in the cellular network communication mode, that is, the terminal and the network device transmit uplink and downlink data/control information through an interface between the terminal and the network (i.e., the Uu interface). The specific network architecture is shown in FIG. 1.

2. Sidelink

Figure 2:
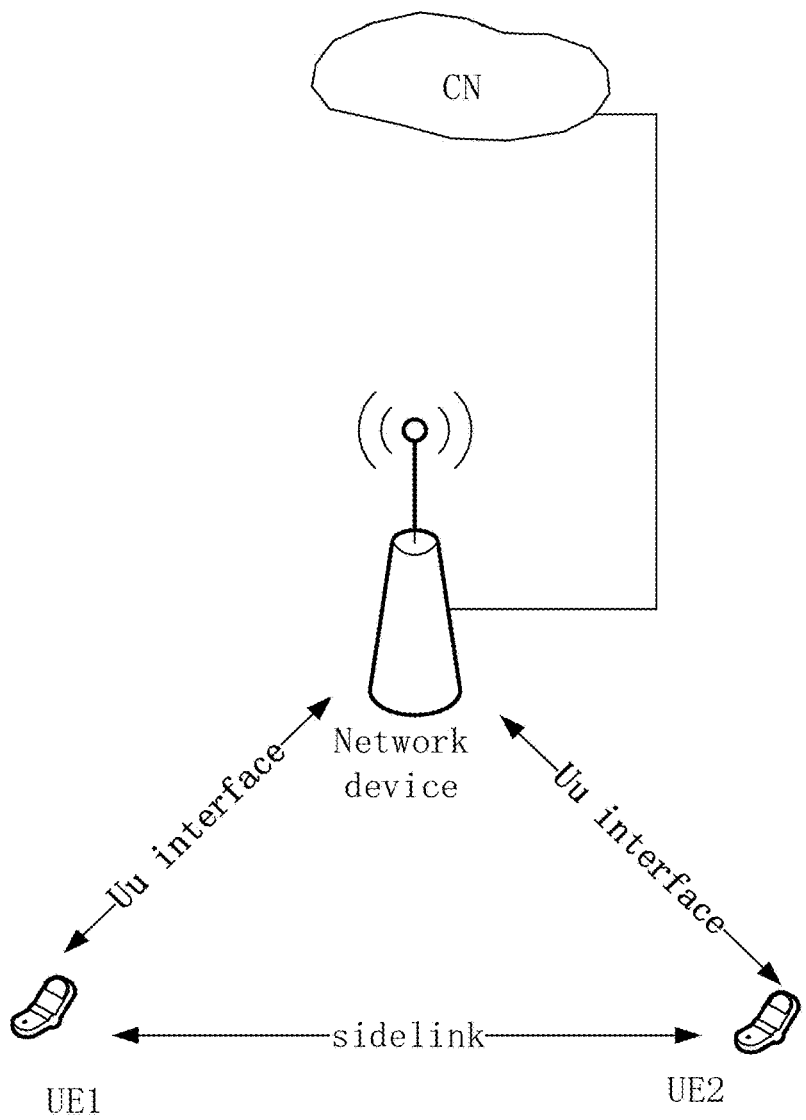
FIG. 2 shows a schematic diagram of a network architecture for sidelink.

Sidelink refers to that adjacent terminals can transmit data/control information through a direct communication link (also known as Sidelink or PC5 link) within a short range. The wireless interface corresponding to the Sidelink is called a direct communication interface (also called the Sidelink interface or the PC5 interface). The specific network architecture is shown in FIG. 2.

3. L2 Relay

In order to extend the network coverage, L2 relay can be considered. The L2 relay may be a terminal with a relay function.

Figure 3:
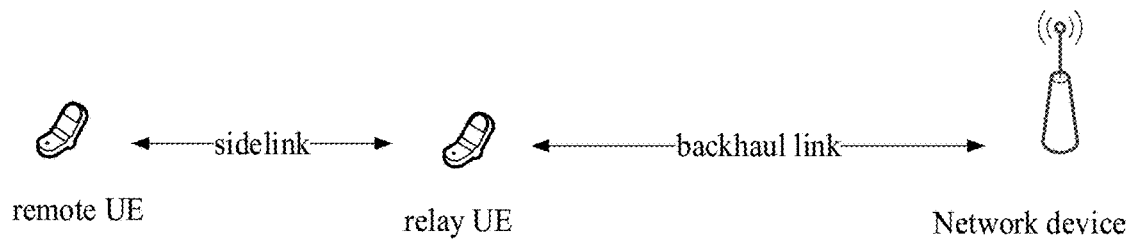
FIG. 3 shows the schematic diagram of UE-to-Network Relay.

For UE-to-Network Relay, the interface between the L2 relay and the network is the Uu interface, and the interface between the L2 relay and the relayed UE (referred to as the remote UE) is the direct communication interface (also known as Sidelink interface or PC5 interface). The link between the L2 relay and the network may be referred to as a backhaul link for the remote UE. A schematic diagram of UE-to-Network Relay is shown in FIG. 3.

Figure 4:
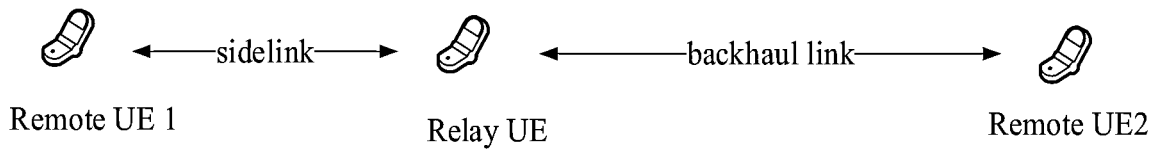
FIG. 4 shows the schematic diagram of UE-to-UE Relay.

For UE-to-UE Relay, the interfaces used between the L2 relay and the remote UE are all sidelink interfaces. The schematic diagram of UE-to-UE Relay is shown in FIG. 4.

Bearers, RLC channels or RLC layer logical channels in the L2 relay scenario are divided into three types:

1. Sidelink interface bearer, RLC channel or RLC layer logical channel: that is, the bearer, RLC channel or RLC layer logical channel between the remote UE and the relay UE;
2. The end-to-end bearer, RLC channel or RLC layer logical channel between the remote UE and the network device: that is, the end-to-end bearer, RLC channel or RLC layer logical channel between the remote end and the network device;
3. the Uu interface backhaul link bear, RLC channel or RLC layer logical channel of the remote UE: that is, the bearer, RLC channel or RLC layer logical channel for carrying the data/control information of the remote UE between the relay UE and the network device.

Regardless of the type of bearer, the RLC channel or the RLC layer logical channel, the bearers and the logical channels are in one-to-one correspondence, and the logical channel has a corresponding logical channel identifier.

It should be noted that, in the scenario that the UE serves as an L2 relay in the related art, there is no clear solution in the related art on how to implement the mapping between bearers or the RLC channels or the RLC layer logical channels of the L2 relay.

In view of the above problems, the present disclosure provides an information transmission method, a terminal, and a network device.

Example 1, for the UE-to-Network Relay, the relay terminal determines the mapping relationship between the two bearers or the RLC channels or the RLC layer logical channels.

Figure 5:
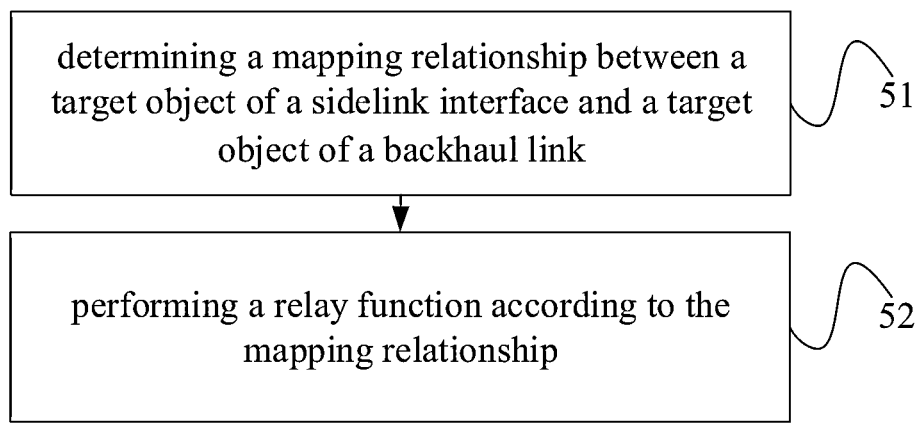
FIG. 5 shows a schematic flowchart of the information transmission method according to the embodiment of the present disclosure.

As shown in FIG. 5, the information transmission method according to an embodiment of the present disclosure, applied to a second terminal, includes:

Step 51, determining a mapping relationship between a target object of a sidelink interface and a target object of a backhaul link;

It should be noted that the target object of the sidelink interface mentioned in the embodiments of the present disclosure is the target object of the sidelink interface between the first terminal and the second terminal, and the target object of the backhaul link is the target object for carrying the data and/or control information of the first terminal between the second terminal and the network device. The target object is one of bearer, radio link control RLC channel or RLC layer logical channel.

Step 52, performing a relay function according to the mapping relationship;

It should be noted that the second terminal mentioned in the embodiments of the present disclosure is a relay terminal corresponding to the first terminal, that is, the second terminal is a relay terminal (relay UE), and the first terminal is a remote terminal (remote UE).

It should also be noted that, in the embodiments of the present disclosure, bearers and logical channels are in one-to-one correspondence, that is, bearers may be represented by logical channels.

It should also be noted that, before the step 51, the method also includes:

Receiving a sidelink interface (PC5-S) connection establishment request sent by the first terminal, and establishing a PC5-S connection with the first terminal.

Specifically, the establishment modes of the PC5-S connection includes one of the following:

A11. Establishing the PC5-S connection by using a PC5-S message dedicated to the relay system;

A12. Adding indication information to the PC5-S connection establishment request message, wherein the indication information is used to indicate that the purpose of establishing the PC5-S connection is to request the second terminal to serve as a relay from the first terminal to the network.

It should also be noted that, in order to ensure that the second terminal can implement the relay function, before the second terminal obtains the mapping relationship between the target object of the sidelink interface and the target object of the backhaul link, the second terminal determines to transmit data and/or control information of the first terminal on the backhaul link by using a default target object of the backhaul link.

It should be noted that the second terminal can determine the mapping relationship in the downlink direction between the target object of the sidelink interface and the target object of the backhaul link, and can also determines the mapping relationship in the uplink direction between the target object of the sidelink interface and the target object of the backhaul link. The implementation of the embodiments of the present disclosure are described in detail in both the uplink direction and the downlink direction.

1. Downlink Direction

Specifically, in this case, there are specifically two implementations.

Implementation 1

Specifically, in this implementation, before step 51, the information transmission method of the embodiment of the present disclosure further includes:

Receiving configuration information of an end-to-end downlink target object between the first terminal and the network device sent by the first terminal or the network device.

It should be noted that the target object is one of a bearer, a radio link control RLC channel and an RLC layer logical channel; in this case, optionally, the second terminal may directly receive the configuration information of the end-to-end downlink target object between the first terminal and the network device sent by the first terminal, the configuration information of the end-to-end downlink target object (such as a bearer) is sent by the network device to the first terminal. The first terminal receives, through the second terminal, an end-to-end radio resource control (RRC) reconfiguration signaling sent by the network device to the first terminal, and the first terminal obtains the configuration information of the end-to-end downlink target object between them the first terminal and the network device through the RRC reconfiguration signaling. In addition, the RRC reconfiguration signaling may also carry the identification information of the first terminal allocated by the network device to the first terminal; optionally, the second terminal may also directly receive the configuration information of the end-to-end downlink target object between the first terminal and the network sent by the network device. The configuration information of the end-to-end downlink target object is sent by the network device to the second terminal. Usually, the second terminal receives the end-to-end RRC reconfiguration signaling sent by the network device. The second terminal obtains the configuration information of the end-to-end downlink target object between the first terminal and the network device through the RRC reconfiguration signaling. In addition, the RRC reconfiguration signaling may also carry the identification information of the first terminal allocated by the network device to the first terminal.

It should be further noted that when the RRC reconfiguration signaling carries the identification information of the first terminal allocated by the network device for the first terminal, optionally, the identification information may indicate that the network device is a cell radio network temporary identifier (C-RNTI) of the first terminal configured by the network device for the first terminal.

That is, when the RRC reconfiguration signaling received by the first terminal from the network device contains the identification information of the first terminal, and the first terminal sends the configuration information of the end-to-end downlink target object to the second terminal, the first terminal can also carry the identification information of the first terminal to the second terminal; when the RRC reconfiguration signaling received by the second terminal from the network device contains the identification information of the first terminal, the second terminal can directly obtain the identification information of the first terminal from the RRC reconfiguration signaling.

After the second terminal receives the configuration information of the end-to-end downlink target object between the first terminal and the network device, the second terminal can determine the configuration information of the sidelink interface target object corresponding to the end-to-end downlink target object between the first terminal and the network device.

It should be noted here that, in order to ensure the quality of service (QoS) of the end-to-end target object between the first terminal and the network device in the downlink direction, the second terminal needs to divide a QoS parameter of the end-to-end downlink target object between the first terminal and the network device between the target object of the sidelink interface and the target object of the backhaul link. The specific division mode depends on the implementation of the second terminal.

It should also be noted that, when determining the mapping relationship between the target object of the sidelink interface and the target object of the backhaul link, if there is no downlink target object that meets the requirements on the current Uu interface backhaul link of the second terminal, then the second terminal transmits a request message to the network device;

The request message is used to request the network device to reconfigure the target object of the backhaul link of the Uu interface in the downlink direction for the second terminal. Optionally, the request message may carry the QoS parameter of the target object of the sidelink interface or the QoS parameter of the target object of the backhaul link proposed by the second terminal.

It should also be noted that, in order to ensure that the network device can accurately obtain the mapping relationship between the target objects, after the second terminal determines the mapping relationship between the target object of the sidelink interface and the target object of the backhaul link, the second terminal sends the mapping relationship between the target object of the backhaul link in the downlink direction and the end-to-end target object between the first terminal and the network device to the network device; or, the second terminal needs to send the mapping relationship among the target object of the backhaul link in the downlink direction, the end-to-end target object between the first terminal and the network device, and the target object of the sidelink interface to the network device.

It should also be noted that, in order to ensure that the first terminal can accurately obtain the mapping relationship between the target objects, after the second terminal determines the mapping relationship between the target object of the sidelink interface and the target object of the backhaul link, the second terminal needs to send the mapping relationship between the target object of the sidelink interface in the downlink direction and the end-to-end target object between the first terminal and the network device to the first terminal; or, the second terminal needs to send the mapping relationship among the target object of the backhaul link in the downlink direction, the end-to-end target object between the first terminal and the network device, and the target object of the sidelink interface to the first terminal.

An example of the specific implementation is as follows.

Figure 6:
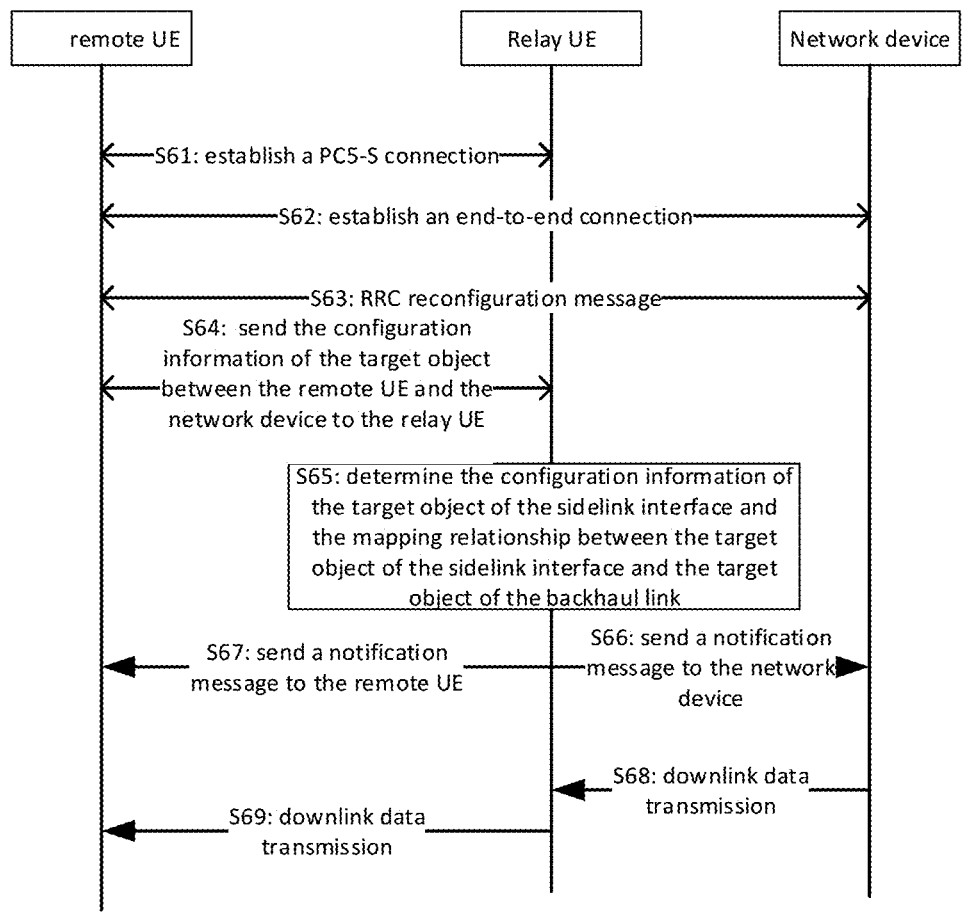
FIG. 6 shows a detailed flowchart of the implementation of the embodiment of the present disclosure.

Case 1, UE-to-Network relay downlink processing, the specific implementation process is shown in FIG. 6.

Step S61, the remote UE and the relay UE establish a PC5-S connection;

Specifically, the remote UE first performs relay UE selection, and then the remote UE and the relay UE establish the PC5-S connection. It is indicated in the PC5-S connection establishment process that the PC5-S connection is for UE-to-Network relay. There are two specific instruction modes:

Introducing a PC5-S message dedicated to relay connection establishment; or

Adding indication information to the sidelink interface PC5-S connection establishment request message in the related art, indicating that the PC5-S connection establishment is for UE-to-Network relay.

Step S62, the remote UE establishes an end-to-end connection with the network device through the relay UE;

Specifically, after the remote UE and the relay UE establish the PC5-S connection, the remote UE triggers a NAS process, and establishes an end-to-end connection with the network device through the relay UE. Before the remote UE and the network device establish an end-to-end connection and obtain the mapping relationship between the sidelink interface bearer (or logical channel or RLC channel) and the backhaul link bearer (or logical channel or RLC channel), the default bearer of the backhaul link (default BH bearer or RLC channel or logical channel) is used for the data and/or control information of the remote UE on the Uu interface backhaul link.

Step S63, the remote UE receives the end-to-end RRC reconfiguration signaling sent by the network device to the remote UE through the relay UE;

The remote UE obtains the configuration information of the end-to-end downlink target object between the remote UE and the network device through the RRC reconfiguration signaling. In addition, the RRC reconfiguration signaling may also carry UE identification information (such as C-RNTI) allocated by the network device to the remote UE.

When the target object is the bearer, the remote UE obtains the configuration information of the end-to-end downlink bearer between the remote UE and the network device through the RRC reconfiguration signaling. When the target object is the RLC channel, the remote UE obtains the configuration information of the end-to-end downlink RLC channel between the remote UE and the network device through the RRC reconfiguration signaling; when the target object is the RLC layer logical channel, the remote UE obtains the configuration information of the end-to-end downlink RLC layer logical channel between the remote UE and the network device through the RRC reconfiguration signaling.

Step S64, the remote UE sends the configuration information of the end-to-end downlink target object between the remote UE and the network device to the relay UE through the sidelink interface;

When the target object is the bearer, the step S64 may be: the remote UE sends the configuration information of the end-to-end downlink bearer between the remote UE and the network device to the relay UE through the sidelink interface; when the target object is an RLC channel, the step S64 may be: the remote UE sends the configuration information of the end-to-end downlink RLC channel between the remote UE and the network device to the relay UE through the sidelink interface; when the target object is the RLC layer logical channel, the step S64 may be: the remote UE sends the configuration information of the end-to-end downlink RLC layer logical channel between the remote UE and the network device to the relay UE through the sidelink interface.

In this step, when the remote UE sends the configuration information of the end-to-end downlink bearer (or RLC channel or RLC layer logical channel) between the remote UE and the network device to the relay UE through the sidelink interface, it may also carry the identification information (such as C-RNTI) allocated by the network device to the remote UE.

Step S65, the relay UE determines the configuration information of the target object of the sidelink interface corresponding to the end-to-end downlink target object between the remote UE and the network device. The relay UE also needs to determine the mapping relationship between the target object of the sidelink interface and the target object of the backhaul link;

Optionally, when the target object is the bearer, the step S65 may be: the relay UE determines the configuration information of the sidelink interface bearer corresponding to the end-to-end downlink bearer between the remote UE and the network device. The relay UE also needs to determine the mapping relationship between the sidelink interface bearer and the backhaul link bearer. When the target object is the RLC channel, the step S65 may be: the relay UE determines the configuration information of the sidelink interface RLC channel corresponding to the end-to-end downlink RLC channel between the remote UE and the network device, and the relay UE also needs to determine the mapping relationship between the sidelink interface RLC channel and the backhaul link RLC channel.

When the target object is the RLC layer logical channel, the step S65 may be: the relay UE determines the configuration information of the sidelink interface RLC layer logic channel corresponding to the end-to-end downlink RLC layer logical channel between the remote UE and the network device. The relay UE also needs to determine the mapping relationship between the sidelink interface RLC layer logical channel and the backhaul link RLC layer logical channel.

In this step, in order to ensure the QoS of the end-to-end uplink bearer (or RLC channel or RLC layer logical channel) between the remote UE and the network device, the relay UE needs to divide the QoS of the end-to-end uplink bearer (or the RLC channel or the RLC layer logical channel) between the sidelink interface and the backhaul link bearer (or the RLC channel or the RLC layer logical channel), and the specific division method depends on the implementation of the relay UE.

In addition, if the backhaul link of the current Uu interface of the relay UE does not have a suitable bearer (or RLC channel or RLC layer logical channel), the relay UE can send a request message to the network device to request the network device to reconfigure the Uu interface backhaul link bear (or the RLC channel or the RLC layer logical channel).

Step S66, the relay UE sends a notification message to the network device;

After the relay UE determines the mapping relationship between the target object of the sidelink interface and the target object of the backhaul link, the relay UE also needs to send a notification message to the network device. The content of the specific notification message may be:

the mapping relationship between the target object of the backhaul link in the downlink direction and the end-to-end target object between the remote UE and the network device; or, The mapping relationship among the target object of the backhaul link in the downlink direction, the end-to-end target object between the remote UE and the network device, and the target object of the sidelink interface.

When the target object is the bearer, in this step, after the relay UE determines the mapping relationship between the sidelink interface bearer and the backhaul link bearer, the relay UE also needs to send a notification message to the network device, the content of the specific notification message may be: the mapping relationship between the backhaul link bearer in the downlink direction and the end-to-end bearer between the remote UE and the network device; or, the mapping relationship among the backhaul link bearer in the downlink direction, the end-to-end bearer between the remote UE and the network devices and the sidelink interface bearer.

When the target object is the RLC channel, in this step, after the relay UE determines the mapping relationship between the sidelink interface RLC channel and the backhaul link RLC channel, the relay UE also needs to send a notification message to the network device, The content of the specific notification message may be: the mapping relationship between the backhaul link RLC channel in the downlink direction and the end-to-end RLC channel between the remote UE and the network device; or, the mapping relationship among the backhaul link RLC channel in the downlink direction, the end-to-end RLC channel between the remote UE and the network device and the sidelink interface RLC channel.

When the target object is the RLC layer logical channel, in this step, after the relay UE determines the mapping relationship between the sidelink interface RLC layer logical channel and the backhaul link RLC layer logical channel, the relay UE also needs to send a notification message to the network device, and the content of the specific notification message may be: the mapping relationship between the backhaul link RLC layer logical channel in the downlink direction and the end-to-end RLC layer logical channel between the remote UE and the network device; or, the mapping relationship among the backhaul link RLC layer logical channel in the downlink direction, the end-to-end RLC layer logical channel between the remote UE and the network device, and the sidelink interface RLC layer logical channel.

Step S67, the relay UE sends a notification message to the remote UE;

There is no strict sequence between the steps S67 and S66.

In this step S67, after the relay UE also needs to determine the mapping relationship between the target object of the sidelink interface and the target object of the backhaul link, the relay UE also needs to send a notification message to the remote UE, and the content of the specific notification message can be:

The mapping relationship between the target object of the sidelink interface in the downlink direction and the end-to-end target object between the remote UE and the network device; or, The mapping relationship among the target object of the backhaul link in the downlink direction, the end-to-end target object between the remote UE and the network device, and the target object of the sidelink interface.

When the target object is the bearer, in this step, after the relay UE needs to determine the mapping relationship between the sidelink interface bearer and the backhaul link bearer, the relay UE also needs to send a notification message to the remote UE, the content of the specific notification message may be: the mapping relationship between the sidelink interface bearer in the downlink direction and the end-to-end bearer between the remote UE and the network device; or, the mapping relationship among the backhaul link bearer in the downlink direction, the end-to-end bearer between the remote UE and the network device and the sidelink interface bearer.

When the target object is the RLC channel (or the RLC layer logical channel), in this step, after the relay UE also needs to determine the mapping relationship between the sidelink interface RLC channel (or the RLC layer logical channel) and the backhaul link RLC channel (or the RLC layer logical channels), the relay UE also needs to send a notification message to the remote UE. The content of the specific notification message can be: the mapping relationship between the sidelink interface RLC channel (or the RLC layer logical channel) in the downlink direction and the end-to-end RLC channel (or the RLC layer logical channel) between the remote UE and the network device; or, the mapping relationship among the backhaul link RLC channel (or the RLC layer logical channel) in the downlink direction, the end-to-end RLC channel (or the RLC layer logical channel) between the remote UE and the network device, and the sidelink interface RLC channel (or the RLC layer logical channel).

In steps S68 and S69, the network device sends end-to-end downlink data between the network device and the remote UE to the remote UE through the relay UE.

Implementation 2

Specifically, in this implementation, before step 51, the information transmission method of the embodiment of the present disclosure further includes:

Receiving the configuration information of the end-to-end downlink target object between the first terminal and the network device sent by the first terminal or the network device.

It should be noted that the target object is one of a bearer, a radio link control RLC channel and an RLC layer logical channel; in this case, optionally, the second terminal may directly receive the configuration information of the end-to-end downlink target object (such as a bearer) between the first terminal and the network device sent by the first terminal, and the configuration information of the end-to-end downlink target object is sent by the network device to the first terminal. Usually, the first terminal receives, through the second terminal, the end-to-end RRC reconfiguration signaling sent by the network device to the first terminal, and the first terminal obtains the configuration information of the end-to-end downlink target object between the first terminal and the network device through the RRC reconfiguration signaling. In addition, the RRC reconfiguration signaling may also carry the identification information of the first terminal allocated by the network device to the first terminal; optionally, the second terminal may also directly receive the configuration information of the end-to-end downlink target object between the first terminal and the network device sent by the network device. The configuration information of the end-to-end downlink target object is sent by the network device to the second terminal. Usually, the second terminal receives the end-to-end RRC reconfiguration signaling sent by the network device. The second terminal obtains the configuration information of the end-to-end downlink target object between the first terminal and the network device through the RRC reconfiguration signaling. In addition, the RRC reconfiguration signaling may also carry the identification information of the first terminal allocated by the network device to the first terminal.

It should be further noted that when the RRC reconfiguration signaling carries the identification information of the first terminal allocated by the network device for the first terminal, optionally, the identification information may the cell radio network temporary identity (C-RNTI) of the first terminal configured by the network device for the first terminal.

That is, when the first terminal receives the RRC reconfiguration signaling sent by the network device and the RRC reconfiguration signaling contains the identification information of the first terminal, when the first terminal sends the configuration information of the end-to-end downlink target object to the second terminal, the first terminal can also carry the identification information of the first terminal to the second terminal; when the second terminal receives the RRC reconfiguration signaling sent by the network device and the RRC reconfiguration signaling contains the identification information of the first terminal, the second terminal can directly obtain the identification information of the first terminal from the RRC reconfiguration signaling.

After the second terminal receives the configuration information of the end-to-end downlink target object between the first terminal and the network device, the second terminal can determine the configuration information of the target object of the sidelink interface corresponding to the end-to-end downlink target object between the first terminal and the network device.

Further, before the second terminal determines the mapping relationship between the target object of the sidelink interface and the target object of the backhaul link, the method further includes:

Receiving the mapping relationship between the end-to-end target object between the first terminal and the network device and the target object of the backhaul link sent by the network device.

Further, the second terminal also needs to determine the configuration information of the sidelink interface target object corresponding to the end-to-end downlink target object between the first terminal and the network device.

Further, in order to ensure the QoS of the end-to-end target object between the first terminal and the network device in the downlink direction, the second terminal needs to determine the QoS parameter of the target object of the sidelink interface according to the QoS parameter of the target object of the backhaul link configured by the network device.

It should also be noted that, in order to ensure that the network device can accurately obtain the mapping relationship between the target objects, after the second terminal determines the mapping relationship between the target object of the sidelink interface and the target object of the backhaul link, the second terminal further sends a notification message to the network device, and the content of the specific notification message can be:

The mapping relationship between the target object of the sidelink interface and the target object of the backhaul link in the downlink direction;

the mapping relationship between the target object of the sidelink interface in the downlink direction and the end-to-end target object between the first terminal and the network device;

The mapping relationship among the target object of the backhaul link in the downlink direction, the end-to-end target object between the first terminal and the network device, and the target object of the sidelink interface.

It should also be noted that, in order to ensure that the first terminal can accurately obtain the mapping relationship between the target objects, after the second terminal determines the mapping relationship between the target object of the sidelink interface and the target object of the backhaul link, the second terminal needs to send the mapping relationship between the target object of the sidelink interface in the downlink direction and the end-to-end target object between the first terminal and the network device to the first terminal; or, the second terminal needs to send the mapping relationship among the target object of the backhaul link in the downlink direction, the end-to-end target object between the first terminal and the network device, and the target object of the sidelink interface to the first terminal.

An example of the specific implementation is as follows.

Figure 7:
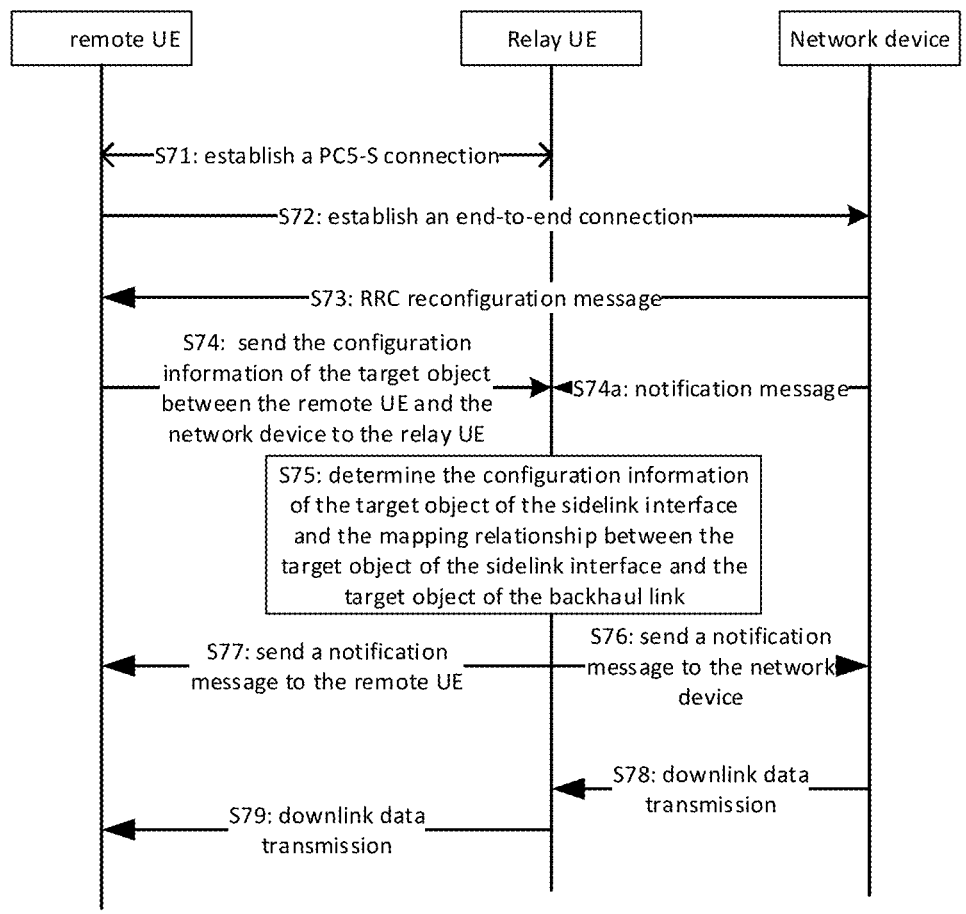
FIG. 7 shows another detailed flowchart of the implementation of the embodiment of the present disclosure.

Case 2, UE-to-Network relay downlink processing, the specific implementation process is shown in FIG. 7.

It should be noted that the difference between the second case and the first case mainly lies in step S74a, step S75 and step S76, and other steps are completely the same. The different steps are described below:

Step S74a, the network device sends a notification message to the relay UE;

In this step, the network device notifies the relay UE of the mapping relationship between the end-to-end target object between the remote UE and the network device and the target object of the backhaul link.

For example, when the target object is a bearer, the network device notifies the relay UE of the mapping relationship between the end-to-end bearer between the remote UE and the network device and the backhaul link bearer. When the target object is an RLC channel, the network device notifies the relay UE of the mapping relationship between the end-to-end RLC channel between the remote UE and the network device and the backhaul link RLC channel; and when the target object is an RLC layer logical channel, the network device notifies the relay UE of the mapping relationship between the end-to-end RLC layer logical channel between the remote UE and the network device and the backhaul link RLC layer logical channel.

Step S75, the relay UE determines the configuration information of the target object of the sidelink interface corresponding to the end-to-end downlink target object between the remote UE and the network device. The relay UE also needs to determine the mapping relationship between the target object of the sidelink interface and the target object of the backhaul link.

Optionally, when the target object is the bearer, the step S75 may be: the relay UE determines the configuration information of the sidelink interface bearer corresponding to the end-to-end downlink bearer between the remote UE and the network device. The relay UE also needs to determine the mapping relationship between the sidelink interface bearer and the backhaul link bearer.

When the target object is the RLC channel (or the RLC layer logical channel), the step S75 may be: the relay UE determines the configuration information of the sidelink interface RLC channel (or RLC layer logical channel) corresponding to the end-to-end downlink RLC channel (or the RLC layer logical channel) between the remote UE and the network device. The relay UE also needs to determine the mapping relationship between the sidelink interface RLC channel (or RLC layer logical channel) and the backhaul link RLC channel (or RLC layer logical channel).

In order to ensure the QoS of the end-to-end bearer (or RLC channel or RLC layer logical channel) between the remote UE and the network device in the downlink direction, the relay UE needs to determine the QoS parameter of the sidelink interface bearer (or RLC channel or RLC layer logical channel) according to the QoS parameter of the backhaul link bearer (or RLC channel or RLC layer logic channel) configured by the network device.

Step S76, the relay UE sends a notification message to the network device;

The content of the specific notification message can be one of the following:

The mapping relationship between the target object of the sidelink interface and the target object of the backhaul link in the downlink direction;

the mapping relationship between the target object of the sidelink interface in the downlink direction and the end-to-end target object between the remote UE and the network device;

The mapping relationship among the target object of the backhaul link in the downlink direction, the end-to-end target object between the remote UE and the network device, and the target object of the sidelink interface.

For example: when the target object is the bearer (or the RLC channel or the RLC layer logical channel), the content of the specific notification message may be one of the following: the mapping relationship between the sidelink interface bearer (or the RLC channel or the RLC layer logical channel)) and the backhaul link bearer (or RLC channel or RLC layer logical channel) in the downlink direction; the mapping relationship between the sidelink interface bearer (or RLC channel or RLC layer logical channel) in the downlink direction and the end-to-end bearer (or RLC channel or RLC layer logical channel) between the remote UE and the network device; the mapping relationship among the backhaul link bearer (or RLC channel or RLC layer logical channel) in the downlink direction, the end-to-end bearer (or RLC channel or RLC layer logical channel) between the remote UE and the network device and the sidelink interface bearer (or RLC channel or RLC layer logical channel).

2. Uplink Direction

Specifically, in this implementation, before step 51, the information transmission method of the embodiment of the present disclosure further includes:

Receiving the configuration information of the end-to-end uplink target object between the first terminal and the network device and the configuration information of the target object of the sidelink interface sent by the first terminal.

It should also be noted that when determining the mapping relationship between the target object of the sidelink interface and the target object of the backhaul link, if the backhaul link of the current Uu interface of the second terminal does not have an uplink target object that meets the requirements, the second terminal sends a request message to the network device;

The request message is used to request the network device to reconfigure the target object of the backhaul link of the Uu interface in the uplink direction for the second terminal.

It should also be noted that, in order to ensure that the network device can accurately obtain the mapping relationship between the target objects, after the second terminal determines the mapping relationship between the target object of the sidelink interface and the target object of the backhaul link, the second terminal sends the mapping relationship between the target object of the backhaul link in the uplink direction and the end-to-end target object between the first terminal and the network device to the network device; or the second terminal needs to send the mapping relationship among the target object of the backhaul link in the uplink direction, the end-to-end target object between the first terminal and the network device, and the target object of the sidelink interface to the network device.

It should also be noted that, in order to ensure that the first terminal can accurately obtain the mapping relationship between the target objects, after the second terminal determines the mapping relationship between the target object of the sidelink interface and the target object of the backhaul link, the second terminal needs to send the mapping relationship between the target object of the sidelink interface in the uplink direction and the end-to-end target object between the first terminal and the network device to the first terminal; or, the second terminal needs to send the mapping relationship between the target object of the backhaul link in the uplink direction, the end-to-end target object between the first terminal and the network device, and the target object of the sidelink interface to the first terminal.

An example of the specific implementation is as follows.

Case 3: UE-to-Network relay uplink processing, the specific implementation process is shown in FIG. 8.

It should be noted that the difference between the third case and the first case mainly lies in step S84a, step S84b, and steps S85 to S89, and other steps are completely the same. The different steps are described below:

Step S84a, the remote UE determines the configuration information of the target object of the sidelink interface corresponding to the end-to-end target object between the remote UE and the network device in the uplink direction.

When the target object is a bearer, the step S84a may be: the remote UE determines the configuration information of the sidelink interface bearer corresponding to the end-to-end bearer between the remote UE and the network device in the uplink direction.

When the target object is the RLC channel (or the RLC layer logical channel), the step S84a may be: the remote UE determines the configuration information of the sidelink interface RLC channel (or the RLC layer logical channel) corresponding to the end-to-end RLC channel (or RLC layer logical channel) between the remote UE and the network device in the uplink direction.

It should be noted that, in order to ensure the QoS of the end-to-end bearer (or RLC channel or RLC layer logical channel) between the remote UE and the network device in the uplink direction, the remote UE needs to divide the QoS of the end-to-end uplink bearer (or RLC channel or RLC layer logical channel) between the sidelink interface bearer (or RLC channel or RLC layer logical channel) and the backhaul link bearer (or RLC channel or RLC layer logical channel), the implementation of the specific division method depends on the remote UE.

Step S84b, the remote UE sends the configuration information of the end-to-end uplink target object between the remote UE and the network device sent by the network device through the RRC reconfiguration signaling and the configuration information of the target object of the sidelink interface determined by the remote UE in Step 3 to the relay UE.

When the target object is the bearer, the step S84b may be: the remote UE sends the configuration information of the end-to-end uplink bearer between the remote UE and the network device sent by the network device through the RRC reconfiguration signaling and the configuration information of the sidelink interface bearer determined by the remote UE in Step 3 to the relay UE.

When the target object is the RLC channel (or the RLC layer logical channel), the step S84b may be: the remote UE sends the configuration information of the end-to-end uplink RLC channel (or RLC layer logical channel) between the remote UE and the network device sent by the network device through the RRC reconfiguration signaling and the configuration information of the sidelink interface RLC channel (or RLC layer logical channel) determined by the remote UE in step 3 to the relay UE.

Step S85, the relay UE determines the mapping relationship between the target object of the sidelink interface and the target object of the backhaul link in the uplink direction;

If the backhaul link of the current Uu interface of the relay UE does not have a suitable uplink target object, the relay UE may send a request message to the network device to request the network device to reconfigure the target object of the uplink backhaul link of the Uu interface.

For example: when the target object is a bearer, the step S85 may be: the relay UE determines the mapping relationship between the sidelink interface bearer and the backhaul link bearer in the uplink direction; if there is no suitable uplink bearer on the backhaul link of the current Uu interface of the relay UE, the relay UE may send a request message to the network device to request the network device to reconfigure the uplink backhaul link bearer of the Uu interface.

When the target object is the RLC channel (or the RLC layer logical channel), the step S85 may be: the relay UE determines the mapping relationship between the sidelink interface RLC channel (or the RLC layer logical channel) and the backhaul link RLC channel (or RLC layer logical channel) in the uplink direction; if there is no suitable uplink RLC channel (or RLC layer logical channel) on the backhaul link of the current Uu interface of the relay UE, the relay UE can send a request message to the network device, to request the network device to reconfigure the uplink backhaul link RLC channel (or RLC layer logical channel) of the Uu interface.

Step S86, the relay UE sends a notification message to the network device;

After the relay UE determines the mapping relationship between the target object of the sidelink interface and the target object of the backhaul link, the relay UE also needs to send a notification message to the network device. The content of the specific notification message may be:

The mapping relationship between the target object of the backhaul link in the uplink direction and the end-to-end target object between the remote UE and the network device; or, The mapping relationship among the target object of the backhaul link in the uplink direction, the end-to-end target object between the remote UE and the network device, and the target object of the sidelink interface.

For example: when the target object is the bearer (or the RLC channel or the RLC layer logical channel), the content of the specific notification message may be: the mapping relationship between the backhaul link bearer (or the RLC channel or the RLC layer logical channel) in the uplink direction and the end-to-end bearer (or RLC channel or RLC layer logical channel) between the remote UE and the network device; or, the mapping relationship among the backhaul link bearer (or RLC channel or RLC layer logical channel) in the uplink direction, the end-to-end bearer (or RLC channel or RLC layer logical channel) between the remote UE and the network device and the sidelink interface bearer (or RLC channel or RLC layer logical channel).

Step S87: the relay UE sends a notification message to the remote UE;

There is no strict sequence between steps S87 and S86.

In step S87, after the relay UE determines the mapping relationship between the target object of the sidelink interface and the target object of the backhaul link, the relay UE also needs to send a notification message to the remote UE, and the content of the specific notification message may be:

The mapping relationship between the target object of the sidelink interface in the uplink direction and the end-to-end target object between the remote UE and the network device; or, The mapping relationship among the target object of the backhaul link in the uplink direction, the end-to-end target object of the remote UE, and the target object of the sidelink interface.

For example: when the target object is the bearer (or the RLC channel or the RLC layer logical channel), the content of the specific notification message may be: the mapping relationship between the sidelink interface bearer (or the RLC channel or the RLC layer logical channel) in the uplink direction and the end-to-end bearer (or RLC channel or RLC layer logical channel) between the remote UE and the network device; or, the mapping relationship among the backhaul link bearer (or RLC channel or RLC layer logical channel) in the uplink direction, the end-to-end bearer (or RLC channel or RLC layer logical channel) of the remote UE, and the sidelink interface bearer (or RLC channel or RLC layer logical channel).

In steps S88 and S89, the remote UE sends the end-to-end uplink data between the network device and the remote UE to the network device through the relay UE.

It should be noted that the embodiment of the present disclosure provides a method for determining the mapping relationship between bearers (or RLC channels or RLC layer logical channels) determined by the relay UE in a relay scenario. The method can ensure that the relay system can work normally.

As shown in FIG. 9, the information transmission method according to the embodiment of the present disclosure, applied to a first terminal, includes:

Step 91, receiving a mapping relationship between a target object of a sidelink interface sent by a second terminal and an end-to-end target object between the first terminal and a network device; or receiving a mapping relationship among a target object of a backhaul link sent by the second terminal, the end-to-end target object between the first terminal and the network device, and the target object of the sidelink interface;

Wherein, the target object is one of a bearer, a radio link control (RLC) channel and a RLC layer logical channel; the target object of the sidelink interface is a target object of a sidelink interface between the first terminal and the second terminal; the target object of the backhaul link is the target object for carrying data and/or control information of the first terminal between the second terminal and the network device; the mapping relationship is a mapping relationship of an uplink direction or an downlink direction; the second terminal is a relay terminal corresponding to the first terminal.

Optionally, the information transmission method further includes:

receiving an end-to-end radio resource control (RRC) reconfiguration signaling sent by the network device through the second terminal;

obtaining configuration information of the end-to-end target object between the first terminal and the network device through RRC reconfiguration signaling;

transmitting the configuration information of the end-to-end target object between the first terminal and the network device to the second terminal;

wherein the configuration information of the end-to-end target object includes configuration information of an uplink target object or configuration information of a downlink target object.

Specifically, the RRC reconfiguration signaling carries identification information of the first terminal.

Optionally, when the configuration information of the end-to-end target object is the configuration information of the downlink target object, after obtaining the configuration information of the end-to-end target object between the first terminal and the network device through the RRC reconfiguration signaling, the method further includes:

transmitting the identification information of the first terminal to the second terminal.

Specifically, the identification information of the first terminal is a cell radio network temporary identification (C-RNTI) of the first terminal.

Optionally, when the configuration information of the end-to-end target object is the configuration information of the uplink target object, after obtaining the configuration information of the end-to-end target object between the first terminal and the network device through the RRC reconfiguration signaling, the method further includes:

determining configuration information of the target object of the sidelink interface corresponding to the end-to-end target object between the first terminal and the network device in an uplink direction;

transmitting the configuration information of the target object of the sidelink interface to the second terminal.

Optionally, after determining the configuration information of the target object of the sidelink interface corresponding to the end-to-end target object between the first terminal and the network device in the uplink direction, the method further includes:

Dividing a QoS parameter of the end-to-end uplink target object between the first terminal and the network device between the target object of the sidelink interface and the target object of the backhaul link.

It should be noted that the first terminal embodiment is a first terminal corresponding to the above method embodiments, and all the implementation in the above method embodiments are applicable to the embodiments of the first terminal, and the same technical effect can also be achieved.

As shown in FIG. 10, the information transmission method according to the embodiment of the present disclosure, applied to a network device, includes:

Step 101: Receiving a mapping relationship between a target object of a backhaul link sent by a second terminal and an end-to-end target object between a first terminal and the network device; or receiving a mapping relationship among the target object of the backhaul link sent by the second terminal, the end-to-end target object between the first terminal and the network device, and the target object of the sidelink interface; or receiving a mapping relationship between the target object of the sidelink interface and the target object of the backhaul link sent by the second terminal; or receiving a mapping relationship between the target object of the sidelink interface sent by the second terminal and the end-to-end target object between the first terminal and the network device;

Wherein, the target object is one of a bearer, a radio link control (RLC) channel and a RLC layer logical channel; the target object of the sidelink interface is a target object of a sidelink interface between the first terminal and the second terminal; the target object of the backhaul link is the target object for carrying data and/or control information of the first terminal between the second terminal and the network device; the mapping relationship is a mapping relationship of an uplink direction or an downlink direction; the second terminal is a relay terminal corresponding to the first terminal.

Optionally, the information transmission method further includes:

Transmitting an end-to-end RRC reconfiguration signaling to the first terminal through the second terminal;

Wherein, the RRC reconfiguration signaling includes: the configuration information of the end-to-end target object between the first terminal and the network device.

Specifically, the RRC reconfiguration signaling carries identification information of the first terminal.

Optionally, when the mapping relationship is a mapping relationship in the downlink direction, the method further includes:

Transmitting the mapping relationship between the end-to-end target object between the first terminal and the network device and the target object of the backhaul link to the second terminal.

It should be noted that the network device embodiment is a network device corresponding to the above method embodiment, and all the implementation in the above method embodiment are applicable to the network device embodiment, and the same technical effect can also be achieved.

As shown in FIG. 11, an embodiment of the present disclosure provides a terminal 110, wherein the terminal is a second terminal, including:

a first determining module 111, configured to determine a mapping relationship between a target object of a sidelink interface and a target object of a backhaul link;

an execution module 112, configured to perform a relay function according to the mapping relationship;

Wherein, the target object is one of a bearer, an RLC channel and an RLC layer logical channel; the second terminal is a relay terminal corresponding to the first terminal; the target object of the sidelink interface is the target object of the sidelink interface between the first terminal and the second terminal; the target object of the backhaul link is the target object for carrying data and/or control information of the first terminal between the second terminal and the network device.

Optionally, for the mapping relationship between the target object of the sidelink interface and the target object of the backhaul link in the downlink direction, before the determining of the mapping relationship between the target object of the sidelink interface and the target object of the backhaul link, the terminal further includes:

a fifth receiving module, configured to receive the configuration information of the end-to-end downlink target object between the first terminal and the network device sent by the first terminal or the network device.

Further, before the first determining module 111 determines the mapping relationship between the target object of the sidelink interface and the target object of the backhaul link, the terminal further includes:

a sixth receiving module, configured to receive identification information of the first terminal sent by the first terminal or the network device;

Wherein, the identification information is configured by the network device for the first terminal.

Specifically, the identification information of the first terminal is the cell radio network temporary identification (C-RNTI) of the first terminal.

Further, after the fifth receiving module receives the configuration information of the end-to-end downlink target object between the first terminal sent by the first terminal or the network device, the terminal further includes:

a sixth determining module, configured to determine configuration information of the target object of the sidelink interface corresponding to the end-to-end downlink target object between the first terminal and the network device.

Further, after the first determining module 111 determines the mapping relationship between the target object of the sidelink interface and the target object of the backhaul link, the terminal further includes:
- a first division module, configured to divide a quality of service (QoS) parameter of the end-to-end downlink target object between the first terminal and the network device between the target object of the sidelink interface and the target object of the backhaul link.

Further, after the first determining module 111 determines the mapping relationship between the target object of the sidelink interface and the target object of the backhaul link, the terminal further includes:
- a third transmitting module, configured to transmit the mapping relationship between the target object of the backhaul link in the downlink direction and the end-to-end target object between the first terminal and the network device to the network device; or
- transmit the mapping relationship among the target object of the backhaul link in the downlink direction, the end-to-end target object between the first terminal and the network device, and the target object of the sidelink interface to the network device.

Further, the first determining module 111 is configured to:
- If there is no downlink target object that meets the requirement on a current Uu interface backhaul link of the second terminal, transmit, by the second terminal, a request message to the network device;
- The request message is used to request the network device to reconfigure the target object of the backhaul link of the Uu interface in the downlink direction for the second terminal.

Further, before the first determining module 111 determines the mapping relationship between the target object of the sidelink interface and the target object of the backhaul link, the terminal further includes:
- A seventh receiving module, configured to receive the mapping relationship between the end-to-end target object between the first terminal and the network device and the target object of the backhaul link sent by the network device.

Specifically, after the first determining module 111 determines the mapping relationship between the target object of the sidelink interface and the target object of the backhaul link, the terminal further includes:
- a first parameter determining module, configured to determine a QoS parameter of the target object of the sidelink interface according to the QoS parameter of the target object of the backhaul link configured by the network device.

Specifically, after the first determining module 111 determines the mapping relationship between the target object of the sidelink interface and the target object of the backhaul link, the terminal further includes:
- a fourth transmitting module, configured to transmit the mapping relationship between the target object of the sidelink interface and the target object of the backhaul link in the downlink direction to the network device; or,
- transmit the mapping relationship between the target object of the sidelink interface in the downlink direction and the end-to-end target object between the first terminal and the network device to the network device; or
- transmit the mapping relationship among the target object of the backhaul link in the downlink direction, the end-to-end target object between the first terminal and the network device, and the target object of the sidelink interface to the network device.

Specifically, after the first determining module 111 determines the mapping relationship between the target object of the sidelink interface and the target object of the backhaul link, the terminal further includes:
- a fifth transmitting module, configured to transmit the mapping relationship between the target object of the sidelink interface in the downlink direction and the end-to-end target object between the first terminal and the network device to the first terminal; or
- transmit the mapping relationship among the target object of the backhaul link in the downlink direction, the end-to-end target object between the first terminal and the network device, and the target object of the sidelink interface to the first terminal.

Optionally, for the mapping relationship between the target object of the sidelink interface and the target object of the backhaul link in the uplink direction, before the first determining module 111 determines the mapping relationship between the target object of the sidelink interface and the target object of the backhaul link, the terminal further includes:
- an eighth receiving module, configured to receive the configuration information of the end-to-end uplink target object between the first terminal and the network device and the configuration information of the target object of the sidelink interface sent by the first terminal.

Optionally, the first determining module 111 is configured to:
- If there is no uplink target object that meets the requirements on the backhaul link of the current Uu interface of the second terminal, transmit, by the second terminal, a request message to the network device;
- The request message is used to request the network device to reconfigure the target object of the backhaul link of the Uu interface in the uplink direction for the second terminal.

Further, after the first determining module 111 determines the mapping relationship between the target object of the sidelink interface and the target object of the backhaul link, the terminal further includes:
- A sixth transmitting module, configured to transmit the mapping relationship between the target object of the backhaul link in the uplink direction and the end-to-end target object between the first terminal and the network device to the network device; or
- Transmit the mapping relationship among the target object of the backhaul link in the uplink direction, the end-to-end target object between the first terminal and the network device, and the target object of the sidelink interface to the network device.

Further, after the first determining module 111 determines the mapping relationship between the target object of the sidelink interface and the target object of the backhaul link, the terminal further includes:
- A seventh transmitting module, configured to transmit the mapping relationship between the target object of the sidelink interface in the uplink direction and the end-to-end target object between the first terminal and the network device to the first terminal; or
- Transmit the mapping relationship among the target object of the backhaul link in the uplink direction, the end-to-end target object between the first terminal and the network device, and the target object of the sidelink interface to the first terminal.

Further, before the first determining module 111 determines the mapping relationship between the target object of the sidelink interface and the target object of the backhaul link, the terminal further includes:

a ninth receiving module, configured to receive a sidelink interface PC5-S connection establishment request sent by the first terminal, and establish a PC5-S connection with the first terminal.

Specifically, the method of establishing the PC5-S connection includes one of the following:

Establishing the PC5-S connection using a PC5-S message dedicated to a relay system; or, Adding indication information to the PC5-S connection establishment request message, where the indication information is used to indicate that the purpose of establishing the PC5-S connection is to request the second terminal to serve as a relay from the first terminal to the network.

Optionally, before the first determining module 111 determines the mapping relationship between the target object of the sidelink interface and the target object of the backhaul link, the terminal further includes:

A first target object determining module, configured to determine that the data and/or control information of the first terminal are transmitted on the backhaul link using a default target object of the backhaul link.

It should be noted that the second terminal embodiment is a second terminal corresponding to the above method embodiments, and all the implementation in the above method embodiments are applicable to the embodiments of the second terminal, and the same technical effect can also be achieved.

Figure 12:
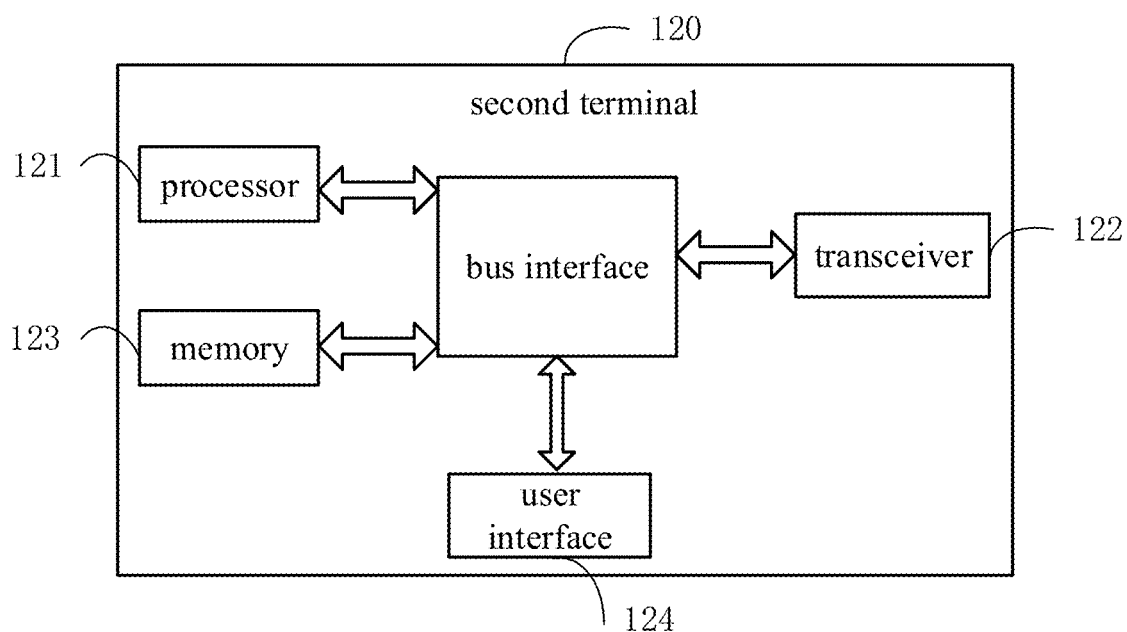
FIG. 12 shows a structure of a terminal according to an embodiment of the present disclosure.

As shown in FIG. 12, an embodiment of the present disclosure further provides a terminal, where the terminal 120 is a second terminal 120, including a processor 121, a transceiver 122, a memory 123, and a program stored on the memory 123 and executed by the processor 121; wherein, the transceiver 122 is connected to the processor 121 and the memory 123 through a bus interface, wherein the processor 121 is used to read the program in the memory, and perform the following processes:

determining a mapping relationship between a target object of a sidelink interface and a target object of a backhaul link;

performing a relay function according to the mapping relationship;

Wherein, the target object is one of a bearer, an RLC channel and an RLC layer logical channel; the second terminal is a relay terminal corresponding to the first terminal; the target object of the sidelink interface is the target object of the sidelink interface between the first terminal and the second terminal; the target object of the backhaul link is the target object for carrying data and/or control information of the first terminal between the second terminal and the network device.

It should be noted that, in FIG. 12, the bus architecture may include any number of interconnected buses and bridges, specifically, various circuits of one or more processors represented by the processor 121 and the memory represented by the memory 123 are linked together. The bus architecture may also link together various other circuits, such as peripherals, voltage regulators, and power management circuits, which are well known in the art and, therefore, will not be described further herein. The bus interface provides the interface. Transceiver 122 may be a number of elements, including transmitters and transceivers that provide means for communicating with various other devices over a transmission medium. For different senders, the user interface 124 may also be an interface capable of externally connecting a required device, and the connected devices include but are not limited to a keypad, a display, a speaker, a microphone, a joystick, and the like. The processor 121 is responsible for managing the bus architecture and general processing, and the memory 123 may store data used by the processor 121 when performing operations.

Optionally, for the mapping relationship between the target object of the sidelink interface and the target object of the backhaul link in the downlink direction, before the determining of the mapping relationship between the target object of the sidelink interface and the target object of the backhaul link, the processor 121 is used to read the program in the memory, and also perform the following processes:

Receiving, by the transceiver 122, the configuration information of the end-to-end downlink target object between the first terminal and the network device sent by the first terminal or the network device.

Further, before determining the mapping relationship between the target object of the sidelink interface and the target object of the backhaul link, the processor 121 is configured to read the program in the memory, and perform the following process:

receiving, through the transceiver 122, identification information of the first terminal sent by the first terminal or the network device;

Wherein, the identification information is configured by the network device for the first terminal.

Specifically, the identification information of the first terminal is the cell radio network temporary identification (C-RNTI) of the first terminal.

Further, after receiving the configuration information of the end-to-end downlink target object between the first terminal and the network device sent by the first terminal or the network device, the processor 121 is configured to read the program in the memory, and also perform the following procedures:

determining configuration information of the target object of the sidelink interface corresponding to the end-to-end downlink target object between the first terminal and the network device.

Further, after determining the mapping relationship between the target object of the sidelink interface and the target object of the backhaul link, the processor 121 is configured to read the program in the memory, and also perform the following process:

dividing a quality of service (QoS) parameter of the end-to-end downlink target object between the first terminal and the network device between the target object of the sidelink interface and the target object of the backhaul link.

Further, after determining the mapping relationship between the target object of the sidelink interface and the target object of the backhaul link, the processor 121 is configured to read the program in the memory, and also perform the following process:

transmitting the mapping relationship between the target object of the backhaul link in the downlink direction and the end-to-end target object between the first terminal and the network device to the network device; or transmitting the mapping relationship among the target object of the backhaul link in the downlink direction, the end-to-end target object between the first terminal and the network device, and the target object of the sidelink interface to the network device.

Further, the processor 121 is configured to read the program in the memory for determining the mapping relationship between the target object of the sidelink interface and the target object of the backhaul link, and perform the following process:

If there is no downlink target object that meets the requirement on a current Uu interface backhaul link of the second terminal, transmitting, by the second terminal, a request message to the network device;

The request message is used to request the network device to reconfigure the target object of the backhaul link of the Uu interface in the downlink direction for the second terminal.

Optionally, before determining the mapping relationship between the target object of the sidelink interface and the target object of the backhaul link, the processor 121 is configured to read the program in the memory, and also perform the following process:

Receiving, by the transceiver 122, the mapping relationship between the end-to-end target object between the first terminal and the network device and the target object of the backhaul link sent by the network device.

Further, after determining the mapping relationship between the target object of the sidelink interface and the target object of the backhaul link, the processor 121 is configured to read the program in the memory, and also perform the following process:

determining a QoS parameter of the target object of the sidelink interface according to the QoS parameter of the target object of the backhaul link configured by the network device.

Further, after determining the mapping relationship between the target object of the sidelink interface and the target object of the backhaul link, the processor 121 is configured to read the program in the memory, and also perform the following process:

transmitting the mapping relationship between the target object of the sidelink interface and the target object of the backhaul link in the downlink direction to the network device; or, transmitting the mapping relationship between the target object of the sidelink interface in the downlink direction and the end-to-end target object between the first terminal and the network device to the network device; or transmitting the mapping relationship among the target object of the backhaul link in the downlink direction, the end-to-end target object between the first terminal and the network device, and the target object of the sidelink interface to the network device.

Specifically, after determining the mapping relationship between the target object of the sidelink interface and the target object of the backhaul link, the processor 121 is configured to read the program in the memory, and also perform the following process:

Transmitting, by the transceiver 122, the mapping relationship between the target object of the sidelink interface in the downlink direction and the end-to-end target object between the first terminal and the network device to the first terminal; or transmitting the mapping relationship among the target object of the backhaul link in the downlink direction, the end-to-end target object between the first terminal and the network device, and the target object of the sidelink interface to the first terminal.

Optionally, for the mapping relationship between the target object of the sidelink interface in the uplink direction and the target object of the backhaul link, before determining the mapping relationship between the target object of the sidelink interface and the target object of the backhaul link, the processor 121 is used to read the program in the memory, and also perform the following processes:

Receiving, by the transceiver 122, the configuration information of the end-to-end uplink target object between the first terminal and the network device and the configuration information of the target object of the sidelink interface sent by the first terminal.

Further, the processor 121 is configured to read the program in the memory for determining the mapping relationship between the target object of the sidelink interface and the target object of the backhaul link, and perform the following processes:

If there is no uplink target object that meets the requirements on the backhaul link of the current Uu interface of the second terminal, transmitting, by the second terminal, a request message to the network device;

The request message is used to request the network device to reconfigure the target object of the backhaul link of the Uu interface in the uplink direction for the second terminal.

Further, after determining the mapping relationship between the target object of the sidelink interface and the target object of the backhaul link, the processor 121 is configured to read the program in the memory, and also perform the following process:

Transmitting, by the transceiver 122, the mapping relationship between the target object of the backhaul link in the uplink direction and the end-to-end target object between the first terminal and the network device to the network device; or Transmitting the mapping relationship among the target object of the backhaul link in the uplink direction, the end-to-end target object between the first terminal and the network device, and the target object of the sidelink interface to the network device.

Further, after determining the mapping relationship between the target object of the sidelink interface and the target object of the backhaul link, the processor 121 is configured to read the program in the memory, and also perform the following process:

Transmitting, by the transceiver, the mapping relationship between the target object of the sidelink interface in the uplink direction and the end-to-end target object between the first terminal and the network device to the first terminal; or Transmit the mapping relationship among the target object of the backhaul link in the uplink direction, the end-to-end target object between the first terminal and the network device, and the target object of the sidelink interface to the first terminal.

Optionally, before determining the mapping relationship between the target object of the sidelink interface and the target object of the backhaul link, the processor 121 is configured to read the program in the memory, and also perform the following process:

Receiving, by the transceiver 122, a sidelink interface PC5-S connection establishment request sent by the first terminal, and establishing a PC5-S connection with the first terminal.

Specifically, the method of establishing the PC5-S connection includes one of the following:

Establishing the PC5-S connection using a PC5-S message dedicated to a relay system; or, Adding indication information to the PC5-S connection establishment request message, where the indication information is used to indicate that the purpose of establishing the PC5-S connection is to request the second terminal to serve as a relay from the first terminal to the network.

Optionally, before determining the mapping relationship between the target object of the sidelink interface and the target object of the backhaul link, the processor 121 is configured to read the program in the memory, and also perform the following process:

determining that the data and/or control information of the first terminal are transmitted on the backhaul link using a default target object of the backhaul link.

Embodiments of the present disclosure further provide a computer-readable storage medium on which a computer program is stored, wherein when the computer program is executed by a processor, the steps of the information transmission method applied to the second terminal are implemented.

Figure 13:
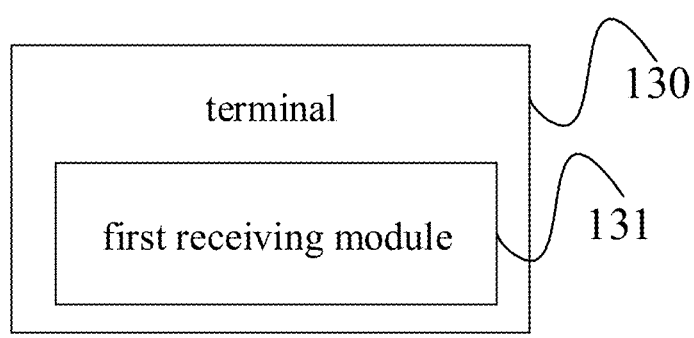
FIG. 13 shows another schematic diagram of the modules of the terminal according to the embodiment of the present disclosure.

As shown in FIG. 13, an embodiment of the present disclosure provides a terminal 130, where the terminal is a first terminal, including:

a first receiving module 131, configured to receive a mapping relationship between a target object of a sidelink interface sent by a second terminal and an end-to-end target object between the first terminal and a network device; or receive a mapping relationship among a target object of a backhaul link sent by the second terminal, the end-to-end target object between the first terminal and the network device, and the target object of the sidelink interface;

Wherein, the target object is one of a bearer, a radio link control (RLC) channel and a RLC layer logical channel; the target object of the sidelink interface is a target object of a sidelink interface between the first terminal and the second terminal; the target object of the backhaul link is the target object for carrying data and/or control information of the first terminal between the second terminal and the network device; the mapping relationship is a mapping relationship of an uplink direction or an downlink direction; the second terminal is a relay terminal corresponding to the first terminal.

Optionally, the terminal 130 further includes:

an eighth transmitting module, configured to receive, through the second terminal, an end-to-end radio resource control (RRC) reconfiguration signaling sent by the network device through the second terminal;

a first obtaining module, configured to obtain configuration information of the end-to-end target object between the first terminal and the network device through RRC reconfiguration signaling;

a ninth transmitting module, configured to transmit the configuration information of the end-to-end target object between the first terminal and the network device to the second terminal;

wherein the configuration information of the end-to-end target object includes configuration information of an uplink target object or configuration information of a downlink target object.

Specifically, the RRC reconfiguration signaling carries identification information of the first terminal.

Optionally, when the configuration information of the end-to-end target object is the configuration information of the downlink target object, after obtaining the configuration information of the end-to-end target object between the first terminal and the network device through the RRC reconfiguration signaling, the terminal further includes:

a tenth transmitting module, configured to transmit the identification information of the first terminal to the second terminal.

Specifically, the identification information of the first terminal is a cell radio network temporary identification (C-RNTI) of the first terminal.

Optionally, when the configuration information of the end-to-end target object is the configuration information of the uplink target object, after obtaining the configuration information of the end-to-end target object between the first terminal and the network device through the RRC reconfiguration signaling, the terminal further includes:

a first configuration determining module, configured to determine configuration information of the target object of the sidelink interface corresponding to the end-to-end target object between the first terminal and the network device in an uplink direction;

an eleventh sending module, configured to transmit the configuration information of the target object of the sidelink interface to the second terminal.

Optionally, after determining the configuration information of the target object of the sidelink interface corresponding to the end-to-end target object between the first terminal and the network device in the uplink direction, the terminal further includes:

a second dividing module, configured to divide a QoS parameter of the end-to-end uplink target object between the first terminal and the network device between the target object of the sidelink interface and the target object of the backhaul link.

It should be noted that the first terminal embodiment is a first terminal corresponding to the above method embodiments, and all the implementation in the above method embodiments are applicable to the embodiments of the first terminal, and the same technical effect can also be achieved.

Figure 14:
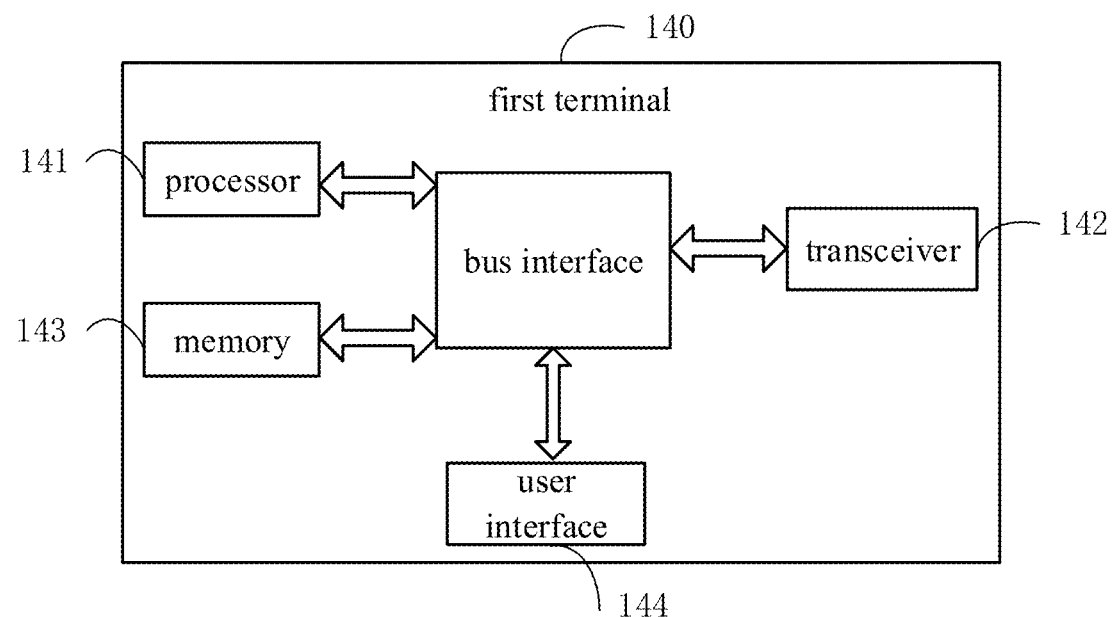
FIG. 14 shows another structure of the terminal according to the embodiment of the present disclosure.

As shown in FIG. 14, an embodiment of the present disclosure further provides a terminal, where the terminal 140 is a first terminal 140, including a processor 141, a transceiver 142, a memory 143, and a program stored on the memory 143 and executed by the processor 141; wherein the transceiver 142 is connected to the processor 141 and the memory 143 through a bus interface, wherein the processor 141 is used to read the program in the memory, and perform the following processes:

Receiving, through the transceiver 142, a mapping relationship between a target object of a sidelink interface sent by a second terminal and an end-to-end target object between the first terminal and a network device; or receiving a mapping relationship among a target object of a backhaul link sent by the second terminal, the end-to-end target object between the first terminal and the network device, and the target object of the sidelink interface;

Wherein, the target object is one of a bearer, a radio link control (RLC) channel and a RLC layer logical channel; the target object of the sidelink interface is a target object of a sidelink interface between the first terminal and the second terminal; the target object of the backhaul link is the target object for carrying data and/or control information of the first terminal between the second terminal and the network device; the mapping relationship is a mapping relationship of an uplink direction or an downlink direction; the second terminal is a relay terminal corresponding to the first terminal.

It should be noted that, in FIG. 14, the bus architecture may include any number of interconnected buses and bridges, specifically, various circuits of one or more processors represented by the processor 141 and the memory represented by the memory 143 are linked together. The bus architecture may also link together various other circuits, such as peripherals, voltage regulators, and power management circuits, which are well known in the art and, therefore, will not be described further herein. The bus interface provides the interface. Transceiver 142 may be a number of elements, including transmitters and transceivers that provide means for communicating with various other devices over a transmission medium. For different senders, the user interface 144 may also be an interface capable of externally connecting a required device, and the connected devices include but are not limited to a keypad, a display, a speaker, a microphone, a joystick, and the like. The processor 141 is responsible for managing the bus architecture and general processing, and the memory 143 may store data used by the processor 141 in performing operations.

Optionally, the processor 141 is configured to read the program in the memory, and also perform the following processes:
  receiving, by the second terminal, an end-to-end radio resource control (RRC) reconfiguration signaling sent by the network device through the second terminal;
  obtaining configuration information of the end-to-end target object between the first terminal and the network device through RRC reconfiguration signaling;
  transmitting the configuration information of the end-to-end target object between the first terminal and the network device to the second terminal;
  wherein the configuration information of the end-to-end target object includes configuration information of an uplink target object or configuration information of a downlink target object.

Specifically, the RRC reconfiguration signaling carries identification information of the first terminal.

Optionally, when the configuration information of the end-to-end target object is the configuration information of the downlink target object, after obtaining the configuration information of the end-to-end target object between the first terminal and the network device through the RRC reconfiguration signaling, the processor 141 is used to read the program in the memory, and perform the following processes:
  Transmitting, by the transceiver 142, the identification information of the first terminal to the second terminal.

Specifically, the identification information of the first terminal is a cell radio network temporary identification (C-RNTI) of the first terminal.

Optionally, when the configuration information of the end-to-end target object is the configuration information of the uplink target object, after obtaining the configuration information of the end-to-end target object between the first terminal and the network device through the RRC reconfiguration signaling, the processor 141 is used to read the program in the memory, and also performs the following processes:
  determining configuration information of the target object of the sidelink interface corresponding to the end-to-end target object between the first terminal and the network device in an uplink direction;
  transmitting the configuration information of the target object of the sidelink interface to the second terminal.

Optionally, after determining the configuration information of the target object of the sidelink interface corresponding to the end-to-end target object between the first terminal and the network device in the uplink direction, the processor 141 is configured to read the program in the memory, and also perform the following procedures:
  Dividing a QoS parameter of the end-to-end uplink target object between the first terminal and the network device between the target object of the sidelink interface and the target object of the backhaul link.

Embodiments of the present disclosure further provide a computer-readable storage medium on which a computer program is stored, wherein when the computer program is executed by a processor, the steps of the information transmission method applied to the first terminal are implemented.

Figure 15:
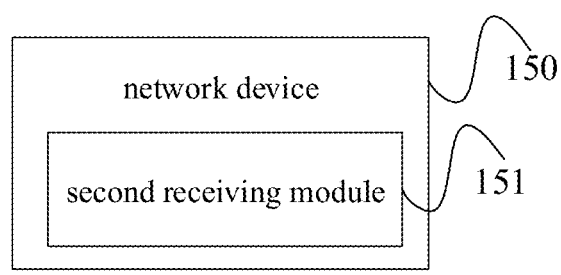
FIG. 15 shows a schematic diagram of the modules of the network device according to the embodiment of the present disclosure.

As shown in FIG. 15, an embodiment of the present disclosure provides a network device 150, including:
  a second receiving module 151, configured to receive a mapping relationship between a target object of a backhaul link sent by a second terminal and an end-to-end target object between a first terminal and the network device; or
  receive a mapping relationship among the target object of the backhaul link sent by the second terminal, the end-to-end target object between the first terminal and the network device, and the target object of the sidelink interface; or
  receive a mapping relationship between the target object of the sidelink interface and the target object of the backhaul link sent by the second terminal; or
  receive a mapping relationship between the target object of the sidelink interface sent by the second terminal and the end-to-end target object between the first terminal and the network device;
  Wherein, the target object is one of a bearer, a radio link control (RLC) channel and a RLC layer logical channel; the target object of the sidelink interface is a target object of a sidelink interface between the first terminal and the second terminal; the target object of the backhaul link is the target object for carrying data and/or control information of the first terminal between the second terminal and the network device; the mapping relationship is a mapping relationship of an uplink direction or an downlink direction; the second terminal is a relay terminal corresponding to the first terminal.

Optionally, the network device 150 further includes:
  A twelfth transmitting module, configured to transmit an end-to-end RRC reconfiguration signaling to the first terminal through the second terminal;
  Wherein, the RRC reconfiguration signaling includes: the configuration information of the end-to-end target object between the first terminal and the network device.

Specifically, the RRC reconfiguration signaling carries identification information of the first terminal.

Optionally, when the mapping relationship is a mapping relationship in the downlink direction, the network device further includes:
  a thirteenth transmitting module, configured to transmit the mapping relationship between the end-to-end target object between the first terminal and the network device and the target object of the backhaul link to the second terminal.

It should be noted that the network device embodiment is a network device corresponding to the above method embodiment, and all the implementation manners in the above method embodiment are applicable to the network device embodiment, and the same technical effect can also be achieved.

Figure 16:
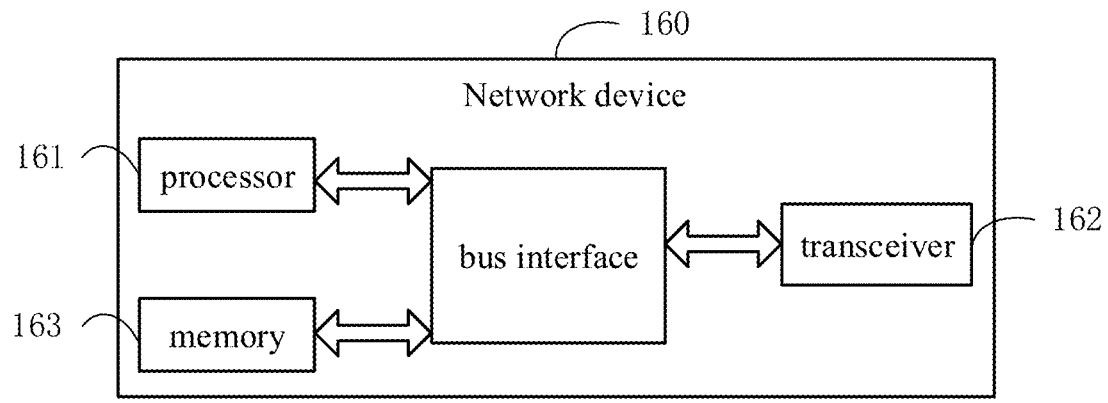
FIG. 16 shows a structure of a network device according to an embodiment of the present disclosure.

As shown in FIG. 16, an embodiment of the present disclosure further provides a network device 160, including a processor 161, a transceiver 162, a memory 163, and a program stored on the memory 163 and executed by the processor 161; Wherein, the transceiver 162 is connected with the processor 161 and the memory 163 through a bus interface, wherein the processor 161 is used to read the program in the memory, and perform the following processes:

Receiving, through the transceiver 162, a mapping relationship between a target object of a backhaul link sent by a second terminal and an end-to-end target object between a first terminal and the network device; or receiving a mapping relationship among the target object of the backhaul link sent by the second terminal, the end-to-end target object between the first terminal and the network device, and the target object of the sidelink interface; or receiving a mapping relationship between the target object of the sidelink interface and the target object of the backhaul link sent by the second terminal; or receiving a mapping relationship between the target object of the sidelink interface sent by the second terminal and the end-to-end target object between the first terminal and the network device;

Wherein, the target object is one of a bearer, a radio link control (RLC) channel and a RLC layer logical channel; the target object of the sidelink interface is a target object of a sidelink interface between the first terminal and the second terminal; the target object of the backhaul link is the target object for carrying data and/or control information of the first terminal between the second terminal and the network device; the mapping relationship is a mapping relationship of an uplink direction or an downlink direction; the second terminal is a relay terminal corresponding to the first terminal.

It should be noted that, in FIG. 16, the bus architecture may include any number of interconnected buses and bridges, specifically, various circuits of one or more processors represented by the processor 161 and the memory represented by the memory 163 are linked together. The bus architecture may also link together various other circuits, such as peripherals, voltage regulators, and power management circuits, which are well known in the art and, therefore, will not be described further herein. The bus interface provides the interface. Transceiver 162 may be a number of elements, including a transmitter and a transceiver, providing a means for communicating with various other devices over a transmission medium. The processor 161 is responsible for managing the bus architecture and general processing, and the memory 163 may store data used by the processor 161 in performing operations.

Optionally, the processor 161 is configured to read the program in the memory, and also perform the following processes:

Transmitting an end-to-end RRC reconfiguration signaling to the first terminal through the second terminal;

Wherein, the RRC reconfiguration signaling includes: the configuration information of the end-to-end target object between the first terminal and the network device.

Specifically, the RRC reconfiguration signaling carries identification information of the first terminal.

Optionally, when the mapping relationship is a mapping relationship in the downlink direction, the processor 161 is configured to read the program in the memory, and also perform the following process:

Transmitting the mapping relationship between the end-to-end target object between the first terminal and the network device and the target object of the backhaul link to the second terminal.

Wherein, the network device may be a base station (Base Transceiver Station, BTS) in Global System of Mobile communication (GSM) or Code Division Multiple Access (CDMA), or may be a broadband CDMA base station (NodeB, NB) in Wideband Code Division Multiple Access (WCDMA), or an evolved base station (Evolutional Node B, eNB, or eNodeB) in Long Term Evolution (LTE), or a relay station or access point, or the base station ng-NB (Next Generation Node B) or the central control unit (CU) or the distributed control unit (DU) in the fifth generation (5th Generation, 5G) network in the future, which is not limited.

Embodiments of the present disclosure also provide a computer-readable storage medium on which a computer program is stored, wherein when the computer program is executed by a processor, the steps of an information transmission method applied to a network device are implemented.

It should be noted that the mapping relationship among the target object of the backhaul link, the end-to-end target object between the first terminal and the network device, and the target object of the sidelink interface mentioned in the foregoing embodiment and subsequent embodiments may refer to the mapping relationship between two target objects among the three target objects, or the mapping relationship among the three target objects.

Embodiment 2: For UE-to-Network Relay, the remote terminal determines the mapping relationship between the two bearers or the RLC channels or the RLC layer logical channels in the uplink direction.

Figure 17:
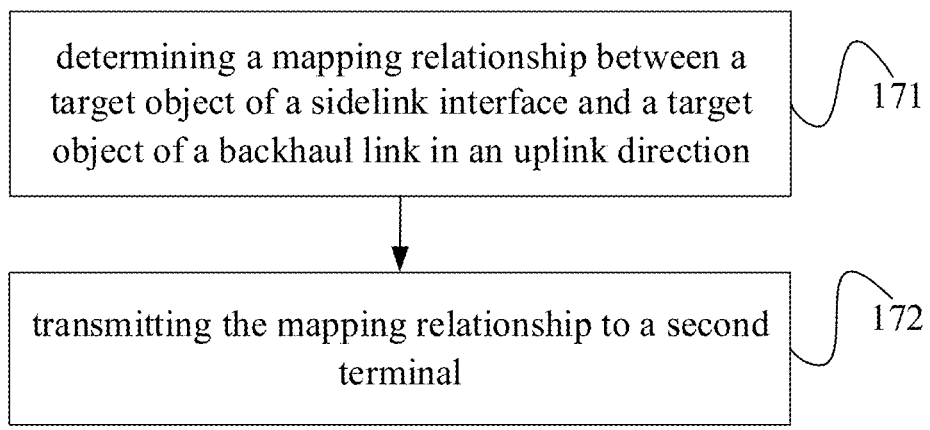
FIG. 17 shows yet another schematic flowchart of the information transmission method according to the embodiment of the present disclosure.

As shown in FIG. 17, an embodiment of the present disclosure further provides an information transmission method, which is applied to a first terminal, including:

Step 171, determining a mapping relationship between a target object of a sidelink interface and a target object of a backhaul link in an uplink direction;

It should be noted that the target object of the sidelink interface is the target object of the sidelink interface between the first terminal and the second terminal; the target object of the backhaul link is the target object for carrying the data and/or control information of the first terminal between the second terminal and the network device; the second terminal is a relay terminal corresponding to the first terminal. The target object is one of a bearer, a radio link control (RLC) channel and an RLC layer logical channel.

Step 172, transmitting the mapping relationship to a second terminal;

It should be noted that the second terminal mentioned in the embodiments of the present disclosure is a relay terminal corresponding to the first terminal, that is, the second terminal is a relay terminal (relay UE), and the first terminal can be regarded as a remote terminal (remote UE).

It should also be noted that, in the embodiments of the present disclosure, bearers and logical channels are in one-to-one correspondence, that is, bearers may be represented by logical channels.

It should also be noted that, before the step 171, the method also includes:

Establishing a sidelink interface PC5-S connection with the second terminal.

Specifically, the establishment method of the PC5-S connection includes one of the following:

B11. Establishing the PC5-S connection using a PC5-S message dedicated to a relay system;

B12. Adding indication information to the PC5-S connection establishment request message, where the indication information is used to indicate that the purpose of establishing the PC5-S connection is to request the second terminal to serve as a relay from the first terminal to the network.

It should also be noted that, in order to ensure that the second terminal can implement the relay function, before the second terminal obtains the mapping relationship between the target object of the sidelink interface and the target object of the backhaul link, the second terminal determines that the data and/or control information of the first terminal is transmitted on the backhaul link using a default target object of the backhaul link.

It should be further noted that, before step 171, the information transmission method in this embodiment of the present disclosure further includes:

receiving, by the second terminal, an end-to-end radio resource control (RRC) reconfiguration signaling sent by the network device;

Wherein, the RRC reconfiguration signaling includes: the configuration information of the end-to-end target object between the first terminal and the network device.

Specifically, the RRC reconfiguration signaling carries identification information of the first terminal. Optionally, the identification information of the first terminal is a cell radio network temporary identity (C-RNTI) of the first terminal.

Further, the second terminal receives the mapping relationship between the end-to-end target object between the first terminal and the network device and the target object of the backhaul link sent by the network device through the end-to-end target object between the second terminal and the network device, and the configuration information of the target object of the backhaul link, the second terminal sends the configuration information of the target object of the backhaul link to the first terminal, and the first terminal receives the configuration information of the target object of the backhaul link sent by the second terminal. After receiving the configuration information of the target object of the backhaul link, the first terminal may determine the configuration information of the target object of the sidelink interface corresponding to the end-to-end target object between the first terminal and the network device in the uplink direction, and determine the mapping relationship between the target object of the sidelink interface and the target object of the backhaul link in the uplink direction.

It should be noted that after the first terminal determines the configuration information of the target object of the sidelink interface corresponding to the end-to-end target object between the first terminal and the network device in the uplink direction, the configuration information of the target object of the sidelink interface is sent to the second terminal.

It should also be noted that, in order to ensure the QoS of the end-to-end target object between the first terminal and the network device in the uplink direction, the first terminal needs to determine the QoS parameters of the target object of the sidelink interface according to the QoS parameter of the end-to-end target object between the first terminal and the network device and the QoS parameter of the target object of the backhaul link.

In order to enable the second terminal and the network device to accurately utilize the mapping relationship of the target object, after the first terminal determines the mapping relationship between the target object of the sidelink interface and the target object of the backhaul link, the first terminal needs to transmit the mapping relationship between the target object of the backhaul link in the uplink direction and the end-to-end target object between the first terminal and the network device to the network device and/or the second terminal; or the first terminal needs to transmit the mapping relationship among the target object of the backhaul link in the uplink direction, the end-to-end target object between the first terminal and the network device, and the target object of the sidelink interface to the network device and/or the second terminal.

The specific the embodiments of the present disclosure is illustrated as follows.

Figures 18, 19:
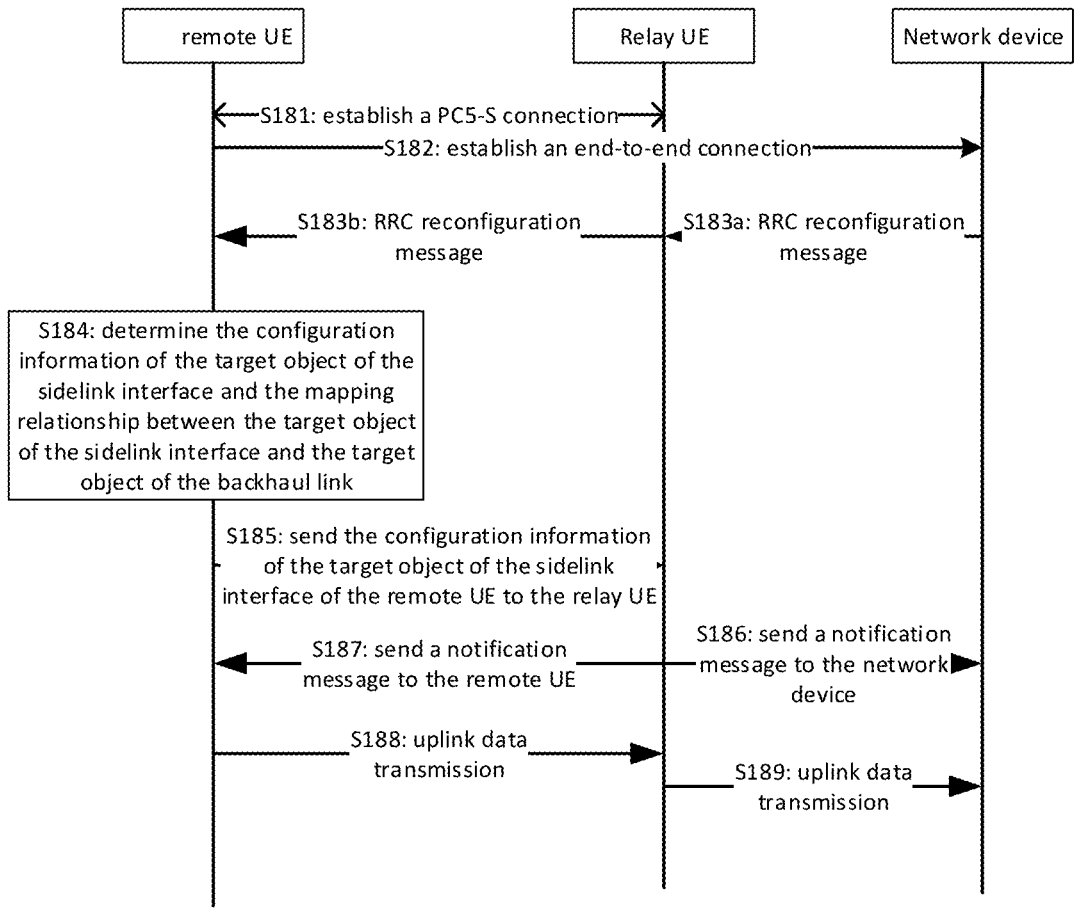
FIG. 18 shows yet another schematic flow chart of the implementation of the embodiment of the present disclosure.
FIG. 19 shows yet another schematic flowchart of the information transmission method according to the embodiment of the present disclosure.

Case 4: UE-to-Network relay uplink processing, the specific implementation process is shown in FIG. 18.

The main difference between the fourth case and the third case in the above-mentioned embodiment lies in the steps S183*a*, S183*b*, S184 and S185, and other steps are completely the same. The different steps are described below:

Step S183*a*, the relay UE receives, through the end-to-end target object between the relay UE and the network device, the mapping relationship between the end-to-end target object between the remote UE and the network device and the target object of the backhaul link sent by the network device through the RRC reconfiguration signaling, and the configuration information of the target object of the backhaul link.

When the target object is the bearer, the step S183*a* may be: the relay UE receives, through the end-to-end bearer between the relay UE and the network device, the mapping relationship between the end-to-end bearer between the remote UE and the network device and the backhaul link bearer sent by the network device through the RRC reconfiguration signaling, and the configuration information of the backhaul link bearer.

When the target object is an RLC channel (or the RLC layer logical channel), the step S183*a* may be: the relay UE receives, through the end-to-end RLC channel (or the RLC layer logical channel) between the relay UE and the network device, the mapping relationship between the end-to-end RLC channel (or the RLC layer logical channel) between the remote UE and the network device and the backhaul link RLC channel (or the RLC layer logical channel) sent by the network device through the RRC reconfiguration signaling, and the configuration information of the backhaul link RLC channel (or the RLC layer logical channel).

Step S183*b*: The relay UE notifies the remote UE of the configuration information of the target object of the backhaul link.

For example: when the target object is a bearer, the relay UE notifies the remote UE of the configuration information of the backhaul link bearer; when the target object is an RLC channel (or the RLC layer logical channel), the relay UE notifies the remote UE of the configuration information of the backhaul link RLC channel (or the RLC layer logical channel).

Step S184, the remote UE determines the configuration information of the target object of the sidelink interface corresponding to the end-to-end target object of the remote UE and the network device in the uplink direction, and the mapping relationship between the target object of the sidelink interface and the target object of the backhaul link.

For example: when the target object is a bearer, the remote UE determines the configuration information of the sidelink interface bearer corresponding to the end-to-end bearer between the remote UE and the network device in the uplink direction, and the mapping relationship between the sidelink interface bearer and the backhaul link bearer.

When the target object is the RLC channel (or the RLC layer logical channel), the remote UE determines the configuration information of the sidelink interface RLC channel (or the RLC layer logical channel) corresponding to the end-to-end RLC channel (or the RLC layer logical channel) between the remote UE and the network device in the uplink direction, and the mapping relationship between the sidelink interface RLC channel (or the RLC layer logical channel) and the backhaul link RLC channel (or the RLC layer logical channel).

In order to ensure the QoS of the end-to-end bearer (or RLC channel or the RLC layer logical channel) between the remote UE and the network device in the uplink direction, the remote UE needs to determine the QoS parameter of the sidelink interface bearer (or RLC channel or the RLC layer logical channel) according to the QoS of the end-to-end uplink bearer (or the RLC channel or the RLC layer logical channel) between the remote UE and the network device and the QoS parameter of the backhaul link bearer (or the RLC channel or the RLC layer logical channel) notified by the relay UE.

Step S185, the remote UE transmits the configuration information of the target object of the sidelink interface determined by the remote UE to the relay UE.

The message sent in this step also carries the mapping relationship between the target object of the sidelink interface and the target object of the backhaul link.

When the target object is the bearer, the remote UE sends the configuration information of the sidelink interface bearer determined by the remote UE to the relay UE. The message also carries the mapping relationship between the sidelink interface bearer and the backhaul link bearer.

When the target object is an RLC channel (or the RLC layer logical channel), the remote UE sends the configuration information of the sidelink interface RLC channel (or the RLC layer logical channel) determined by the remote UE to the relay UE. The message also carries the mapping relationship between the sidelink interface RLC channel (or the RLC layer logical channel) and the backhaul link RLC channel (or the RLC layer logical channel).

It should be noted that, in the embodiments of the present disclosure, the remote terminal determines the mapping relationship between two bearers, RLC channels, or the RLC layer logical channels in the relay scenario, and notify the relay terminal and/or the network device to ensure that the relay system can work normally.

As shown in FIG. 19, the information transmission method according to the embodiment of the present disclosure, applied to a second terminal, includes:

Step 191, receiving a mapping relationship between a target object of a sidelink interface and a target object of a backhaul link in an uplink direction sent by a first terminal;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is a relay terminal corresponding to the first terminal.

Optionally, the information transmission method further includes:
Receiving the configuration information of the target object of the sidelink interface corresponding to the end-to-end target object between the first terminal and the network device in the uplink direction sent by the first terminal.

Optionally, before the step 191, the method also includes:
Receiving the mapping relationship between the end-to-end target object between the first terminal and the network device and the target object of the backhaul link and the configuration information of the target object of the backhaul link sent by the network device.

Further, after receiving the mapping relationship between the end-to-end target object between the first terminal and the network device and the target object of the backhaul link and the configuration information of the target object of the backhaul link sent by the network device, the method also includes:
Transmitting the configuration information of the target object of the backhaul link to the first terminal.

Optionally, before receiving the mapping relationship between the target object of the sidelink interface and the target object of the backhaul link in the uplink direction sent by the first terminal, the method further includes:
determining that data and/or control information of the first terminal is transmitted on the backhaul link using a default target object of the backhaul link.

It should be noted that the second terminal embodiment is a second terminal corresponding to the above method embodiments, and all the implementation in the above method embodiments are applicable to the embodiments of the second terminal, and the same technical effect can also be achieved.

As shown in FIG. 20, the information transmission method of the embodiment of the present disclosure, applied to a network device, includes:

Step 201, receiving a mapping relationship between a target object of a backhaul link in an uplink direction sent by a second terminal and an end-to-end target object between a first terminal and the network device; or receiving a mapping relationship among the target object of the backhaul link in the uplink direction sent by the second terminal, the end-to-end target object between the first terminal and the network device, and the target object of the sidelink interface;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is the relay terminal corresponding to the first terminal.

Optionally, the information transmission method further includes:
Transmitting an end-to-end radio resource control (RRC) reconfiguration signaling to the first terminal through the second terminal;

Wherein, the RRC reconfiguration signaling includes: the configuration information of the end-to-end target object between the first terminal and the network device.

Specifically, the RRC reconfiguration signaling carries the identification information of the first terminal.

Optionally, the information transmission method further includes:

transmitting the mapping relationship between the end-to-end target object between the first terminal and the network device and the target object of the backhaul link, and the configuration information of the target object of the backhaul link to the second terminal.

It should be noted that the network device embodiment is a network device corresponding to the above method embodiment, and all the implementation in the above method embodiment are applicable to the network device embodiment, and the same technical effect can also be achieved.

As shown in FIG. 21, an embodiment of the present disclosure provides a terminal 210, where the terminal is a first terminal, including:

a second determining module 211 is configured to determine a mapping relationship between a target object of a sidelink interface and a target object of a backhaul link in an uplink direction;

a first transmitting module 212, configured to transmit the mapping relationship to a second terminal;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is a relay terminal corresponding to the first terminal.

Optionally, before the second determining module 211 determines the mapping relationship between the target object of the sidelink interface and the target object of the backhaul link in the uplink direction, the method further includes:

A fourteenth sending module, configured to receive, through the second terminal, an end-to-end radio resource control (RRC) reconfiguration signaling sent by the network device;

Wherein, the RRC reconfiguration signaling includes: the configuration information of the end-to-end target object between the first terminal and the network device.

Further, the RRC reconfiguration signaling carries the identification information of the first terminal.

Specifically, the identification information of the first terminal is a cell radio network temporary identification (C-RNTI) of the first terminal.

Optionally, before the second determining module 211 determines the mapping relationship between the target object of the sidelink interface and the target object of the backhaul link in the uplink direction, the method further includes:

a tenth receiving module, configured to receive the configuration information of the target object of the backhaul link sent by the second terminal.

Optionally, before the second determining module 211 determines the mapping relationship between the target object of the sidelink interface and the target object of the backhaul link in the uplink direction, the method further includes:

a second configuration determining module, configured to determine the configuration information of the target object of the sidelink interface corresponding to the end-to-end target object between the first terminal and the network device in the uplink direction.

Further, after the second configuration determining module determines the configuration information of the target object of the sidelink interface corresponding to the end-to-end target object between the first terminal and the network device in the uplink direction, the method further includes:

a fifteenth transmitting module, configured to transmit the configuration information of the target object of the sidelink interface to the second terminal.

Optionally, after the second determining module 211 determines the mapping relationship between the target object of the sidelink interface and the target object of the backhaul link in the uplink direction, the method further includes:

A second parameter determining module, configured to determine the QoS parameter of target object of the sidelink interface according to the QoS parameter of the end-to-end target object between the first terminal and the network device and the QoS parameter of the target object of the backhaul link.

Optionally, after the second determining module 211 determines the mapping relationship between the target object of the sidelink interface and the target object of the backhaul link in the uplink direction, the method further includes:

A sixteenth transmitting module, configured to transmit the mapping relationship between the target object of the backhaul link in the uplink direction and the end-to-end target object between the first terminal and the network device to the network device and/or the second terminal; or transmit the mapping relationship among the target object of the backhaul link in the uplink direction, the end-to-end target object between the first terminal and the network device, and the target object of the sidelink interface to the network device and/or second terminal.

Optionally, before the second determining module 211 determines the mapping relationship between the target object of the sidelink interface and the target object of the backhaul link in the uplink direction, the method further includes:

a connection establishment module, configured to establish a sidelink interface PC5-S connection with the second terminal.

Specifically, the establishment method of the PC5-S connection includes one of the following:

Establishing a PC5-S connection using a PC5-S message dedicated to a relay system; or, Adding indication information to the PC5-S connection establishment request message, wherein the indication information is used to indicate that the purpose of establishing the PC5-S connection is to request the second terminal to serve as a relay from the first terminal to the network.

It should be noted that the first terminal embodiment is a first terminal corresponding to the above method embodiments, and all the implementation in the above method embodiments are applicable to the embodiments of the first terminal, and the same technical effect can also be achieved.

An embodiment of the present disclosure further provides a terminal, where the terminal is a first terminal. Specifically, the structure of the terminal is the same as that of the terminal in FIG. 14.

Specifically, the processor executes the program to implement the following steps:

determining a mapping relationship between a target object of a sidelink interface and a target object of a backhaul link in an uplink direction;

transmitting the mapping relationship to a second terminal;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is a relay terminal corresponding to the first terminal.

Optionally, before determining the mapping relationship between the target object of the sidelink interface and the target object of the backhaul link in the uplink direction, the processor further executes the program to implement the following step:

receiving, through the second terminal, an end-to-end radio resource control (RRC) reconfiguration signaling sent by the network device;

Wherein, the RRC reconfiguration signaling includes: the configuration information of the end-to-end target object between the first terminal and the network device.

Further, the RRC reconfiguration signaling carries the identification information of the first terminal.

Specifically, the identification information of the first terminal is a cell radio network temporary identification (C-RNTI) of the first terminal.

Optionally, before determining the mapping relationship between the target object of the sidelink interface and the target object of the backhaul link in the uplink direction, the processor further executes the program to implement the following step:

receiving the configuration information of the target object of the backhaul link sent by the second terminal.

Optionally, before determining the mapping relationship between the target object of the sidelink interface and the target object of the backhaul link in the uplink direction, the processor further executes the program to implement the following step:

determining the configuration information of the target object of the sidelink interface corresponding to the end-to-end target object between the first terminal and the network device in the uplink direction.

Optionally, after determining the configuration information of the target object of the sidelink interface corresponding to the end-to-end target object between the first terminal and the network device in the uplink direction, the processor further executes the program to implement the following step:

transmitting the configuration information of the target object of the sidelink interface to the second terminal.

Optionally, after determining the mapping relationship between the target object of the sidelink interface and the target object of the backhaul link in the uplink direction, the processor further executes the program to implement the following step:

determining the QoS parameter of target object of the sidelink interface according to the QoS parameter of the end-to-end target object between the first terminal and the network device and the QoS parameter of the target object of the backhaul link.

Optionally, after determining the mapping relationship between the target object of the sidelink interface and the target object of the backhaul link in the uplink direction, the processor further executes the program to implement the following step:

transmitting the mapping relationship between the target object of the backhaul link in the uplink direction and the end-to-end target object between the first terminal and the network device to the network device and/or the second terminal; or transmitting the mapping relationship among the target object of the backhaul link in the uplink direction, the end-to-end target object between the first terminal and the network device, and the target object of the sidelink interface to the network device and/or second terminal.

Optionally, before determining the mapping relationship between the target object of the sidelink interface and the target object of the backhaul link in the uplink direction, the processor further executes the program to implement the following step:

establishing a sidelink interface PC5-S connection with the second terminal.

Specifically, the establishment method of the PC5-S connection includes one of the following:

Establishing a PC5-S connection using a PC5-S message dedicated to a relay system; or, Adding indication information to the PC5-S connection establishment request message, wherein the indication information is used to indicate that the purpose of establishing the PC5-S connection is to request the second terminal to serve as a relay from the first terminal to the network.

Embodiments of the present disclosure further provide a computer-readable storage medium on which a computer program is stored, wherein when the computer program is executed by a processor, the steps of the information transmission method applied to the first terminal are implemented.

As shown in FIG. 22, an embodiment of the present disclosure provides a terminal 220, where the terminal is a second terminal, including:

a third receiving module 221, configured to receive a mapping relationship between a target object of a sidelink interface and a target object of a backhaul link in an uplink direction sent by a first terminal;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is a relay terminal corresponding to the first terminal.

Optionally, the terminal 220 further includes:

an eleventh receiving module, configured to receive the configuration information of the target object of the sidelink interface corresponding to the end-to-end target object between the first terminal and the network device in the uplink direction sent by the first terminal.

Optionally, before the third receiving module 221 receives the mapping relationship between the target object of the sidelink interface and the target object of the backhaul link in the uplink direction sent by the first terminal, the terminal further includes:

a twelfth receiving module, configured to receive the mapping relationship between the end-to-end target object between the first terminal and the network device and the target object of the backhaul link and the configuration information of the target object of the backhaul link sent by the network device.

Further, after the twelfth receiving module receives the mapping relationship between the end-to-end target object between the first terminal and the network device and the target object of the backhaul link sent by the network device, and the configuration information of the target object of the backhaul link, the terminal also includes:

a seventeenth transmitting module, configured to transmit the configuration information of the target object of the backhaul link to the first terminal.

Optionally, before the third receiving module 221 receives the mapping relationship between the target object of the sidelink interface and the target object of the backhaul link in the uplink direction sent by the first terminal, the terminal further includes:

a second target object determination module, configured to determine that the data and/or control information of the first terminal is transmitted on the backhaul link using a default target object of the backhaul link.

It should be noted that the second terminal embodiment is a second terminal corresponding to the above method embodiments, and all the implementation in the above method embodiments are applicable to the embodiments of the second terminal, and the same technical effect can also be achieved.

An embodiment of the present disclosure further provides a terminal, where the terminal is a second terminal. Specifically, the structure of the terminal is the same as that of the terminal in FIG. 12.

Specifically, the processor implements the following steps when executing the program:

receiving a mapping relationship between a target object of a sidelink interface and a target object of a backhaul link in an uplink direction sent by a first terminal;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is a relay terminal corresponding to the first terminal.

Optionally, the processor further executes the program to implement the following step:

Receiving the configuration information of the target object of the sidelink interface corresponding to the end-to-end target object between the first terminal and the network device in the uplink direction sent by the first terminal.

Optionally, before receiving the mapping relationship between the target object of the sidelink interface and the target object of the backhaul link in the uplink direction sent by the first terminal, the processor further executes the program to implement the following step:

Receiving the mapping relationship between the end-to-end target object between the first terminal and the network device and the target object of the backhaul link and the configuration information of the target object of the backhaul link sent by the network device.

Optionally, after receiving the mapping relationship between the end-to-end target object between the first terminal and the network device and the target object of the backhaul link and the configuration information of the target object of the backhaul link sent by the network device, the processor further executes the program to implement the following step:

Transmitting the configuration information of the target object of the backhaul link to the first terminal.

Optionally, before receiving the mapping relationship between the target object of the sidelink interface and the target object of the backhaul link in the uplink direction sent by the first terminal, the processor further executes the program to implement the following step:

determining that data and/or control information of the first terminal is transmitted on the backhaul link using a default target object of the backhaul link.

Embodiments of the present disclosure further provide a computer-readable storage medium on which a computer program is stored, wherein when the computer program is executed by a processor, the steps of the information transmission method applied to the second terminal are implemented.

Figure 23:
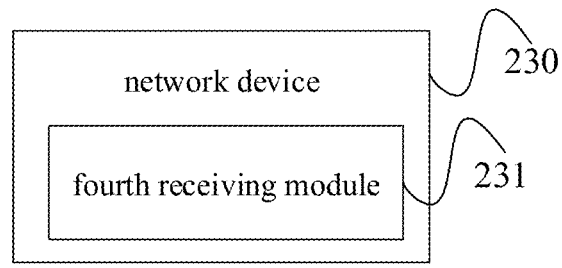
FIG. 23 shows another schematic diagram of the modules of the network device according to the embodiment of the present disclosure.

As shown in FIG. 23, an embodiment of the present disclosure provides a network device 230, including:

a fourth receiving module 231, configured to receive a mapping relationship between a target object of a backhaul link in an uplink direction sent by a second terminal and an end-to-end target object between a first terminal and the network device; or receive a mapping relationship among the target object of the backhaul link in the uplink direction sent by the second terminal, the end-to-end target object between the first terminal and the network device, and the target object of the sidelink interface;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is the relay terminal corresponding to the first terminal.

Optionally, the network device 230 further includes:

An eighteenth sending module, configured to transmit an end-to-end radio resource control (RRC) reconfiguration signaling to the first terminal through the second terminal;

Wherein, the RRC reconfiguration signaling includes: the configuration information of the end-to-end target object between the first terminal and the network device.

Specifically, the RRC reconfiguration signaling carries the identification information of the first terminal.

Optionally, the network device 230 further includes:

a nineteenth transmitting module, configured to transmit the mapping relationship between the end-to-end target object between the first terminal and the network device and the target object of the backhaul link, and the configuration information of the target object of the backhaul link to the second terminal.

It should be noted that the network device embodiment is a network device corresponding to the above method embodiment, and all the implementation in the above method embodiment are applicable to the network device embodiment, and the same technical effect can also be achieved.

An embodiment of the present disclosure further provides a network device, and specifically, the structure of the network device is the same as that of the network device in FIG. 16.

Specifically, the processor executes the program to implement the following step:

Receiving, through the transceiver, a mapping relationship between a target object of a backhaul link in an uplink direction sent by a second terminal and an end-to-end target object between a first terminal and the network device; or receiving a mapping relationship among the target object of the backhaul link in the uplink direction sent by the second terminal, the end-to-end target object between the first terminal and the network device, and the target object of the sidelink interface;

Wherein, the target object is one of bearer, radio link control RLC channel and RLC layer logical channel; the target object of the sidelink interface is the target object of the sidelink interface between the first terminal and the second terminal; the target object of the backhaul link is the target object between the second terminal and the network device for carrying the data and/or control information of the first terminal; the second terminal is the relay terminal corresponding to the first terminal.

Optionally, the processor further executes the program to implement the following step:

Transmitting an end-to-end radio resource control (RRC) reconfiguration signaling to the first terminal through the second terminal;

Wherein, the RRC reconfiguration signaling includes: the configuration information of the end-to-end target object between the first terminal and the network device.

Specifically, the RRC reconfiguration signaling carries the identification information of the first terminal.

Optionally, the processor further executes the program to implement the following step:

transmitting the mapping relationship between the end-to-end target object between the first terminal and the network device and the target object of the backhaul link, and the configuration information of the target object of the backhaul link to the second terminal.

Embodiments of the present disclosure also provide a computer-readable storage medium on which a computer program is stored, wherein when the computer program is executed by a processor, the steps of an information transmission method applied to a network device are implemented.

Embodiment 3: For UE-to-UE Relay, the relay terminal determines the mapping relationship between the two bearers or the RLC channels or the RLC layer logical channels.

Figure 24:
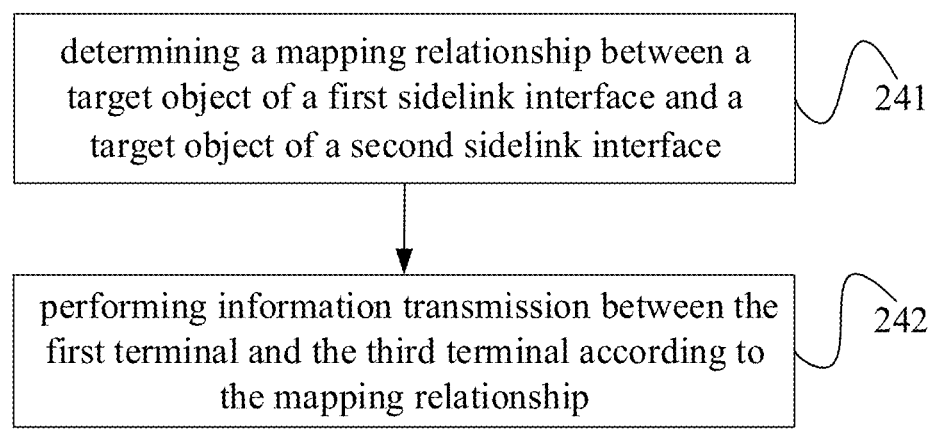
FIG. 24 shows yet another schematic flowchart of the information transmission method according to the embodiment of the present disclosure.

As shown in FIG. 24, an embodiment of the present disclosure further provides an information transmission method, which is applied to a second terminal, including:

Step 241, determining a mapping relationship between a target object of a first sidelink interface and a target object of a second sidelink interface;

It should be noted that the target object of the first sidelink interface is the target object of the sidelink interface between a first terminal and a second terminal; the target object of the second sidelink interface is the target object of the sidelink interface between the second terminal and a third terminal. The target object is one of bearer, radio link control RLC channel and RLC layer logical channel.

Step 242, performing information transmission between the first terminal and the third terminal according to the mapping relationship;

It should be noted that the second terminal is a relay terminal for communication between the first terminal and the third terminal.

It should be further noted that, before the step 241, the method also includes:

receiving configuration information of an end-to-end target object between the first terminal and the third terminal and configuration information of the target object of the first sidelink interface sent by the first terminal;

determining configuration information of the target object of the second sidelink interface according to the configuration information of the end-to-end target object and the configuration information of the target object of the first sidelink interface.

It should be noted that, the configuration information of the target object of the first sidelink interface is determined by the first terminal according to the configuration information of the end-to-end target object between the first terminal and the third terminal. Further, in order to ensure the quality of service (QoS) of the end-to-end target object between the first terminal and the third terminal in the UE-to-UE relay scenario, the first terminal needs to divide the QoS parameter of the end-to-end target object between the first terminal and the third terminal, between the target object of the first sidelink interface and the target object of the second sidelink interface;

It should be noted that the target object of the second sidelink interface is the target object of the sidelink interface between the second terminal and the third terminal.

The specific application of the embodiments of the present disclosure is illustrated as follows.

Figure 25:
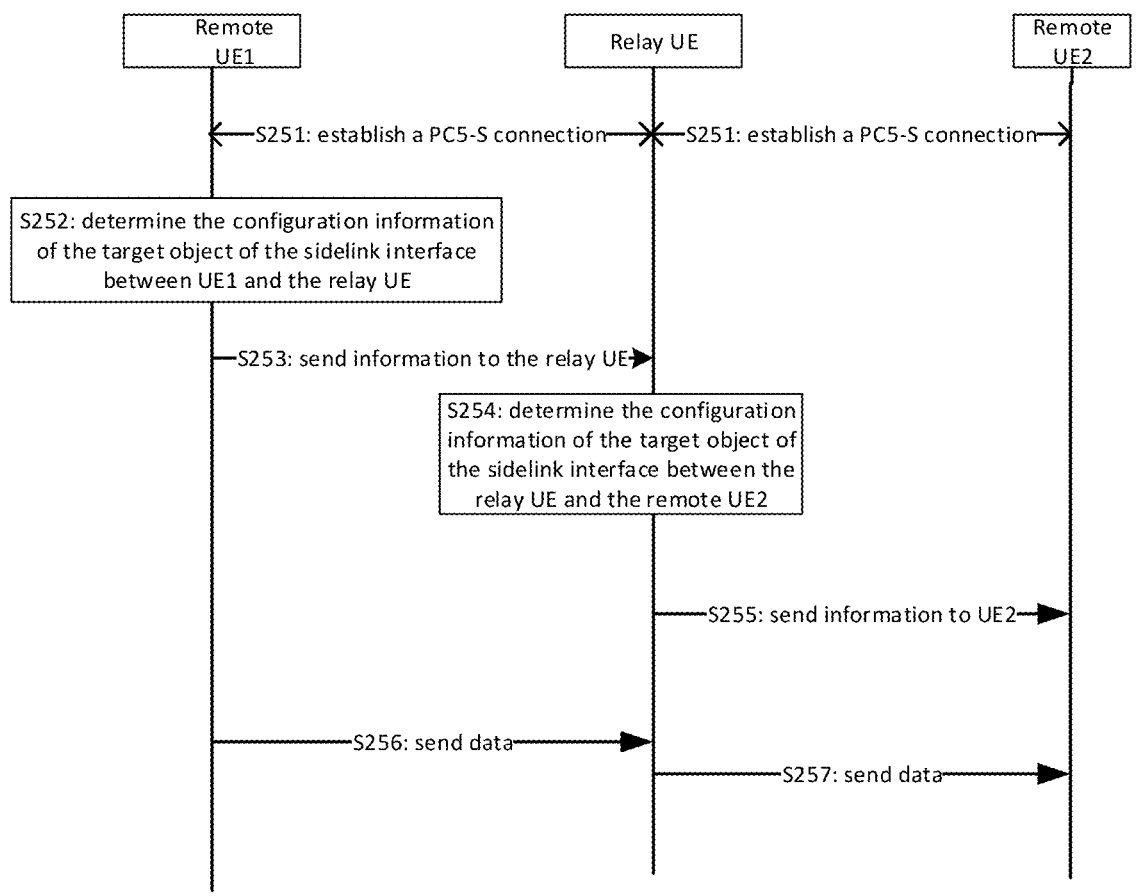
FIG. 25 shows yet another flowchart of the implementation of the embodiment of the present disclosure.

Case 5: UE-to-UE relay, the relay terminal determines the mapping relationship, and the specific implementation process is shown in FIG. 25.

Step S251, the remote UE1 and the relay UE, and the remote UE2 and the relay UE respectively establish a PC5-S connection;

Step S252, the remote UE1 determines the configuration information of the end-to-end target object between the remote UE1 and the remote UE2, and determines the configuration information of the target object between the remote UE1 and the relay according to the configuration information of the end-to-end target object;

In order to ensure the QoS of the end-to-end target object between the remote UE1 and the remote UE2 in the UE-to-UE relay scenario, the remote UE1 needs to divide the QoS of the end-to-end target object between the sidelink interface between the remote UE1 and the relay UE and the sidelink interface between the remote UE2 and the relay UE, and the specific division method depends on the implementation of the remote UE1.

When the target object is the bearer, the remote UE1 determines the configuration information of the end-to-end bearer between the remote UE1 and the remote UE2, and determines the configuration information of the bearer between the remote UE1 and the relay according to the configuration information of the end-to-end bearer.

When the target object is the RLC channel (or the RLC layer logical channel), the remote UE1 determines the configuration information of the end-to-end RLC channel (or the RLC layer logical channel) between the remote UE1 and the remote UE2, and determines the configuration information of the RLC channel (or the RLC layer logical channel) between the remote UE1 and the relay according to the configuration information of the end-to-end RLC channel (or the RLC layer logical channel).

Step S253, the remote UE1 sends a message to the relay UE;

The remote UE1 notifies the relay UE of the configuration information of the end-to-end target object between the remote UE1 and the remote UE2 determined in step S251, and the configuration information of the target object of the sidelink interface between the remote UE1 and the relay UE.

For example: when the target object is a bearer (or an RLC channel or an RLC layer logical channel), the remote UE1 notifies the relay UE of the configuration information of the end-to-end bearer (or an RLC channel or an RLC layer logic channel) between the remote UE1 and the remote UE2 determined in step S251 and the configuration information of the layer logical channel) and the configuration information of the sidelink interface bearer (or the RLC channel or the RLC layer logical channel) between the remote UE1 and the relay UE.

Step S254, the relay UE determines the configuration information of the target object of the sidelink interface between the relay UE and the remote UE2 according to the configuration information of the end-to-end target object between the remote UE1 and the remote UE2 and the configuration information of the target object of the sidelink interface between the remote UE1 and the relay UE, and establishes the mapping relationship among the end-to-end target object between the remote UE1 and the remote UE2, the target object of the sidelink interface between the remote UE1 and the relay UE, and the target object of the sidelink interface between the relay UE and the remote UE2.

For example: when the target object is a bearer (or an RLC channel or an RLC layer logical channel), step S254 may be: the relay UE determines the configuration information of the sidelink interface bearer (or RLC channel or RLC layer logical channel) between the relay UE and the remote UE2 based on the configuration information of the end-to-end bearer (or RLC channel or RLC layer logic channel) between the remote UE1 and the remote UE2) and the configuration information of the sidelink interface bearer (or RLC channel or RLC layer logical channel) between the remote UE1 and the relay UE, and establishes the mapping relationship among the end-to-end bearer (or RLC channel or RLC layer logical channel) between remote UE1 and the remote UE2, and sidelink interface bearer (or RLC channel or RLC layer logical channel) between remote UE1 and relay UE and the sidelink interface bearer (or RLC channel or RLC layer logical channel) between the relay UE and the remote UE2.

Step S255, the relay UE sends information to the remote UE2;

The relay UE will notify the UE2 of the configuration information of the target object of the sidelink interface between the relay UE and the remote UE2, as well as the mapping relationship among the end-to-end target object between the remote UE1 and UE2, the target object of the sidelink interface between the remote UE1 and the relay UE, and the target object of the sidelink interface between the relay UE and the remote UE2.

For example: when the target object is the bearer (or the RLC channel or the RLC layer logical channel), the relay UE notify the UE2 of the configuration information of the sidelink interface bearer (or the RLC channel or the RLC layer logical channel) between the relay UE and the remote UE2, as well as the mapping relationship among the end-to-end bearer (or RLC channel or RLC layer logical channel) between the remote UE1 and UE2, the sidelink interface bearer (or RLC channel or RLC layer logic channel) between the remote UE1 and the relay UE, the sidelink interface bearer (or the RLC channel or the RLC layer logical channel) between the relay UE and the remote UE2.

Step S256 and Step S257, transmitting data.

It should be noted that the embodiments of the present disclosure provide a method for determining the mapping relationship between two bearers or RLC channels or RLC layer logical channels in a relay scenario by the relay UE in a relay scenario. This method can ensure that the relay system can work normally.

Figure 26:
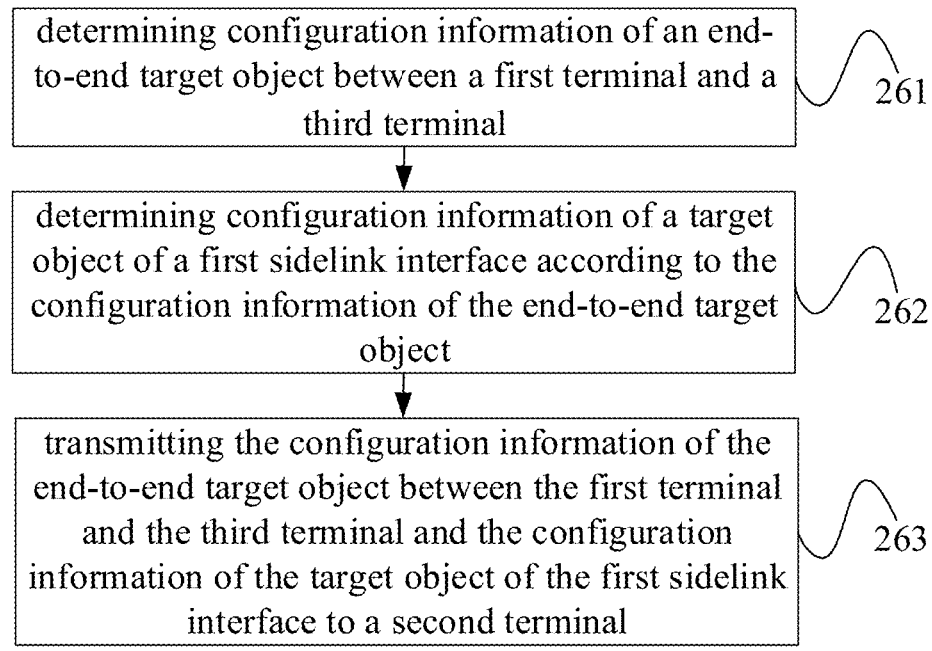
FIG. 26 shows yet another schematic flowchart of the information transmission method according to the embodiment of the present disclosure.

As shown in FIG. 26, the information transmission method according to the embodiment of the present disclosure, applied to the first terminal, includes:

Step 261, determining configuration information of an end-to-end target object between a first terminal and a third terminal;

Step 262, determining configuration information of a target object of a first sidelink interface according to the configuration information of the end-to-end target object;

Step 263, transmitting the configuration information of the end-to-end target object between the first terminal and the third terminal and the configuration information of the target object of the first sidelink interface to a second terminal;

Wherein, the target object is one of a bearer, a radio link control (RLC) channel and an RLC layer logical channel; the target object of the first sidelink interface is the target object of the sidelink interface between the first terminal and the second terminal; the second terminal is a relay terminal between the first terminal and the third terminal for communication.

Optionally, after the step 262, the method also includes:

dividing a QoS parameter of the end-to-end target object between the first terminal and the third terminal, between the target object of the first sidelink interface and a target object of a second sidelink interface;

The target object of the second sidelink interface is the target object of the sidelink interface between the second terminal and the third terminal.

It should be noted that the first terminal embodiment is a first terminal corresponding to the above method embodiments, and all the implementation in the above method embodiments are applicable to the embodiments of the first terminal, and the same technical effect can also be achieved.

Figure 27:
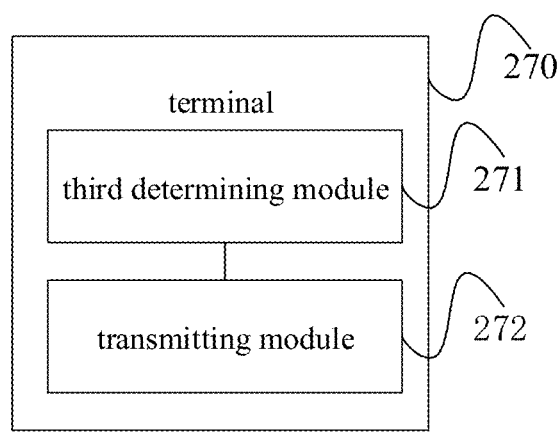
FIG. 27 shows yet another schematic diagram of the modules of the terminal according to the embodiment of the present disclosure.

As shown in FIG. 27, an embodiment of the present disclosure provides a terminal 270, where the terminal is a second terminal, including:

a third determining module 271, configured to determine a mapping relationship between the target object of the first sidelink interface and the target object of the second sidelink interface;

a transmitting module 272, configured to transmit information between the first terminal and the third terminal according to the mapping relationship;

Wherein, the target object is one of bearer, radio link control RLC channel and RLC layer logical channel; the second terminal is a relay terminal for communication between the first terminal and the third terminal; the target object of the first sidelink interface is the target object of the sidelink interface between the first terminal and the second terminal; the target object of the second sidelink interface is the target object of the sidelink interface between the second terminal and the third terminal.

Optionally, before the third determining module 271 determines the mapping relationship between the target object of the first sidelink interface and the target object of the second sidelink interface, the terminal further includes:

A thirteenth receiving module, configured to receive the configuration information of the end-to-end target object between the first terminal and the third terminal and the configuration information of the target object of the first sidelink interface sent by the first terminal;

a third configuration determining module, configured to determine the configuration information of the target object of the second sidelink interface according to the configuration information of the end-to-end target object and the configuration information of the target object of the first sidelink interface.

It should be noted that the second terminal embodiment is a second terminal corresponding to the above method embodiments, and all the implementation in the above method embodiments are applicable to the embodiments of the second terminal, and the same technical effect can also be achieved.

An embodiment of the present disclosure further provides a terminal, where the terminal is a second terminal. Specifically, the structure of the terminal is the same as that of the terminal in FIG. 12.

Specifically, the processor implements the following steps when executing the program:

determining a mapping relationship between a target object of a first sidelink interface and a target object of a second sidelink interface;

performing information transmission between the first terminal and the third terminal according to the mapping relationship;

Wherein, the target object is one of bearer, radio link control RLC channel and RLC layer logical channel; the second terminal is a relay terminal for communication between the first terminal and the third terminal; the target object of the first sidelink interface is the target object of the sidelink interface between the first terminal and the second terminal; the target object of the second sidelink interface is the target object of the sidelink interface between the second terminal and the third terminal.

Optionally, before determining the mapping relationship between the target object of the first sidelink interface and the target object of the second sidelink interface, the processor further executes the program to implement the following step:

receiving configuration information of an end-to-end target object between the first terminal and the third terminal and configuration information of the target object of the first sidelink interface sent by the first terminal;

determining configuration information of the target object of the second sidelink interface according to the configuration information of the end-to-end target object and the configuration information of the target object of the first sidelink interface.

Embodiments of the present disclosure further provide a computer-readable storage medium on which a computer program is stored, wherein when the computer program is executed by a processor, the steps of the information transmission method applied to the second terminal are implemented.

Figure 28:
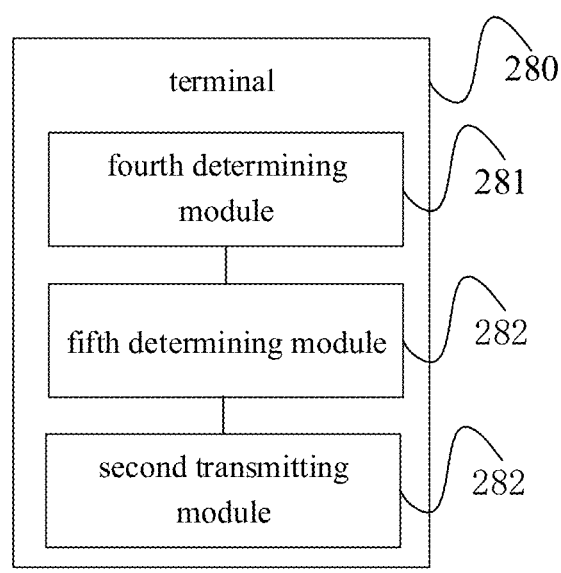
FIG. 28 shows yet another schematic diagram of the modules of the terminal according to the embodiment of the present disclosure.

As shown in FIG. 28, an embodiment of the present disclosure provides a terminal 280, where the terminal is a first terminal, including:

a fourth determining module 281, configured to determine configuration information of an end-to-end target object between a first terminal and a third terminal;

a fifth determining module 282, configured to determine configuration information of a target object of a first sidelink interface according to the configuration information of the end-to-end target object t;

a second transmitting module 283, configured to transmit the configuration information of the end-to-end target object between the first terminal and the third terminal and the configuration information of the target object of the first sidelink interface to a second terminal;

Wherein, the target object is one of a bearer, a radio link control (RLC) channel and an RLC layer logical channel; the target object of the first sidelink interface is the target object of the sidelink interface between the first terminal and the second terminal; the second terminal is a relay terminal between the first terminal and the third terminal for communication.

Optionally, after the fifth determining module 282 determines the configuration information of the target object of the first sidelink interface according to the configuration information of the end-to-end target object, the terminal further includes:

a third dividing module, configured to divide a QoS parameter of the end-to-end target object between the first terminal and the third terminal, between the target object of the first sidelink interface and a target object of a second sidelink interface;

The target object of the second sidelink interface is the target object of the sidelink interface between the second terminal and the third terminal.

It should be noted that the first terminal embodiment is a first terminal corresponding to the above method embodiments, and all the implementation in the above method embodiments are applicable to the embodiments of the first terminal, and the same technical effect can also be achieved.

An embodiment of the present disclosure further provides a terminal, where the terminal is a first terminal. Specifically, the structure of the terminal is the same as that of the terminal in FIG. 14.

Specifically, the processor implements the following steps when executing the program:

determining configuration information of an end-to-end target object between a first terminal and a third terminal;

determining configuration information of a target object of a first sidelink interface according to the configuration information of the end-to-end target object t;

transmitting the configuration information of the end-to-end target object between the first terminal and the third terminal and the configuration information of the target object of the first sidelink interface to a second terminal;

Wherein, the target object is one of a bearer, a radio link control (RLC) channel and an RLC layer logical channel; the target object of the first sidelink interface is the target object of the sidelink interface between the first terminal and the second terminal; the second terminal is a relay terminal between the first terminal and the third terminal for communication.

Optionally, after determining the configuration information of the target object of the first sidelink interface according to the configuration information of the end-to-end target object, the processor further executes the program to implement the following step:

dividing a QoS parameter of the end-to-end target object between the first terminal and the third terminal, between the target object of the first sidelink interface and a target object of a second sidelink interface;

The target object of the second sidelink interface is the target object of the sidelink interface between the second terminal and the third terminal.

Embodiments of the present disclosure further provide a computer-readable storage medium on which a computer program is stored, wherein when the computer program is executed by a processor, the steps of the information transmission method applied to the first terminal are implemented.

Those of ordinary skill in the art can realize that the units and algorithm steps of each example described in conjunction with the embodiments can be implemented in electronic hardware, or a combination of computer software and electronic hardware. Whether these functions are performed in hardware or software depends on the specific application and design constraints of the technical solution. Those of ordinary skill in the art may implement the described functionality using different methods for each particular application, but such implementations should not be considered beyond the scope of the present disclosure.

Those skilled in the art can clearly understand that, for the convenience and brevity of description, the specific working process of the above-described systems, devices and units may refer to the corresponding processes in the foregoing method embodiments, which will not be repeated here.

In the embodiments provided in the present disclosure, it should be understood that the disclosed device and method may be implemented in other manners. For example, the device embodiments described above are only illustrative. For example, the division of the units is only a logical function division. In actual implementation, there may be other division methods. For example, multiple units or components may be combined or be integrated into another system, or some features can be ignored, or not implemented. On the other hand, the shown or discussed mutual coupling or direct coupling or communication connection may be through some interfaces, indirect coupling or communication connection of devices or units may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit.

From the description of the above embodiments, those skilled in the art can clearly understand that the method of the above embodiment can be implemented by means of software plus a necessary general hardware platform, and of course can also be implemented by hardware, but in many cases the former is better implementation. According to this understanding, the technical solutions disclosed in the present disclosure can be embodied in the form of software products in essence or the parts that make contributions to the related art. The computer software products are stored in a storage medium (such as ROM/RAM, magnetic CD or CD), including several instructions to make a terminal (which may be a mobile phone, computer, server, air conditioner, or network device, etc.) execute the methods described in the various embodiments disclosed in the present disclosure.

Those of ordinary skill in the art can understand that all or part of the processes in the methods of the above embodiments can be accomplished by controlling the relevant hardware through a computer program, and the program can be stored in a computer-readable storage medium, and the program may include the processes of the embodiments of the above-mentioned methods. The storage medium may be a magnetic disk, an optical disk, a read-only memory (ROM), or a random access memory (RAM) or the like.

It can be understood that the embodiments described in the present disclosure may be implemented by hardware, software, firmware, middleware, microcode, or a combination thereof. For hardware implementation, modules, units and sub-units can be implemented in one or more Application Specific Integrated Circuits (ASIC), Digital Signal Processor (DSP), Digital Signal Processing Device (DSP Device, DSPD), Programmable Logic Device (PLD), Field-Programmable Gate Array (FPGA), general-purpose processor, controller, microcontroller, microprocessor, in other electronic units or combinations thereof.

For software implementation, the techniques described in the embodiments of the present disclosure may be implemented through modules (e.g., procedures, functions, etc.) that perform the functions described in the embodiments of the present disclosure. Software codes may be stored in memory and executed by a processor. The memory can be implemented in the processor or external to the processor.

The above are optional embodiments of the present disclosure. It should be pointed out that for those skilled in the art, several improvements and modifications can be made without departing from the principles described in the present disclosure. These improvements and modifications should also be fall in the protection scope of the present disclosure.

What is claimed is:

1. An information transmission method, applied to a second terminal, comprising:
    determining a mapping relationship between a target object of a sidelink interface and a target object of a backhaul link;
    performing a relay function according to the mapping relationship;
    wherein the target object is one of a bearer, a radio link control (RLC) channel and an RLC layer logical channel;
    the second terminal is a relay terminal corresponding to a first terminal;
    the target object of the sidelink interface is a target object of a sidelink interface between the first terminal and the second terminal;

the backhaul link is a link between the second terminal and a network device, the target object of the backhaul link is a target object for carrying data and/or control information of the first terminal between the second terminal and the network device;
wherein after determining the mapping relationship between the target object of the sidelink interface and the target object of the backhaul link, the method further includes:
transmitting a mapping relationship between the target object of the backhaul link in the downlink direction and the end-to-end target object between the first terminal and the network device to the network device; or
transmitting a mapping relationship among the target object of the backhaul link in the downlink direction, the end-to-end target object between the first terminal and the network device, and the target object of the sidelink interface to the network device.

2. The information transmission method according to claim 1, wherein, for the mapping relationship between the target object of the sidelink interface and the target object of the backhaul link in a downlink direction, before determining the mapping relationship between the target object of the sidelink interface and the target object of the backhaul link, the method further includes:
receiving configuration information of an end-to-end downlink target object between the first terminal and the network device sent by the first terminal or the network device.

3. The information transmission method according to claim 2, wherein before determining the mapping relationship between the target object of the sidelink interface and the target object of the backhaul link, the method further includes:
receiving identification information of the first terminal sent by the first terminal or the network device;
wherein the identification information is configured by the network device for the first terminal.

4. The information transmission method according to claim 3, wherein the identification information of the first terminal is a cell radio network temporary identification (C-RNTI) of the first terminal.

5. The information transmission method according to claim 2, wherein after receiving the configuration information of the end-to-end downlink target object between the first terminal and the network device sent by the first terminal or the network device, the method further includes:
determining configuration information of the target object of the sidelink interface corresponding to the end-to-end downlink target object between the first terminal and the network device.

6. The information transmission method according to claim 2, wherein after determining the mapping relationship between the target object of the sidelink interface and the target object of the backhaul link, the method further includes:
dividing a quality of service (QOS) parameter of the end-to-end downlink target object between the first terminal and the network device, between the target object of the sidelink interface and the target object of the backhaul link.

7. The information transmission method according to claim 1, wherein the determining the mapping relationship between the target object of the sidelink interface and the target object of the backhaul link comprises:
if there is no downlink target object that meets a requirement on a backhaul link of a current Uu interface of the second terminal, transmitting, by the second terminal, a request message to the network device;
wherein the request message is used to request the network device to reconfigure the target object of the backhaul link of the Uu interface in the downlink direction for the second terminal.

8. The information transmission method according to claim 2, wherein before determining the mapping relationship between the target object of the sidelink interface and the target object of the backhaul link, the method further includes:
receiving the mapping relationship between the end-to-end target object between the first terminal and the network device and the target object of the backhaul link sent by the network device;
or
wherein after determining the mapping relationship between the target object of the sidelink interface and the target object of the backhaul link, the method further includes:
determining a QoS parameter of the target object of the sidelink interface according to the QoS parameter of the target object of the backhaul link configured by the network device;
or
wherein after determining the mapping relationship between the target object of the sidelink interface and the target object of the backhaul link, the method further includes:
transmitting a mapping relationship between the target object of the sidelink interface and the target object of the backhaul link in the downlink direction to the network device; or,
transmitting a mapping relationship between the target object of the sidelink interface in the downlink direction and the end-to-end target object between the first terminal and the network device to the network device; or
transmitting a mapping relationship among the target object of the backhaul link in the downlink direction, the end-to-end target object between the first terminal and the network device, and the target object of the sidelink interface to the network device.

9. The information transmission method according to claim 2, wherein after determining the mapping relationship between the target object of the sidelink interface and the target object of the backhaul link, the method further includes:
transmitting a mapping relationship between the target object of the sidelink interface in the downlink direction and the end-to-end target object between the first terminal and the network device to the first terminal; or
transmitting a mapping relationship among the target object of the backhaul link in the downlink direction, the end-to-end target object between the first terminal and the network device, and the target object of the sidelink interface to the first terminal.

10. The information transmission method according to claim 1, wherein, for the mapping relationship between the target object of the sidelink interface and the target object of the backhaul link in an uplink direction, before determining the mapping relationship between the target object of the sidelink interface and the target object of the backhaul link, the method further includes:
receiving configuration information of an end-to-end uplink target object between the first terminal and the network device and configuration information of the target object of the sidelink interface sent by the first terminal, wherein the determining the mapping relationship between the target object of the sidelink interface and the target object of the backhaul link comprises:

if there is no uplink target object that meets a requirement on the backhaul link of a current Uu interface of the second terminal, transmitting, by the second terminal, a request message to the network device;

wherein the request message is used to request the network device to reconfigure the target object of the backhaul link of the Uu interface in the uplink direction for the second terminal;

or wherein after determining the mapping relationship between the target object of the sidelink interface and the target object of the backhaul link, the method further includes:

transmitting the mapping relationship between the target object of the backhaul link in the uplink direction and the end-to-end target object between the first terminal and the network device to the network device; or transmitting the mapping relationship among the target object of the backhaul link in the uplink direction, the end-to-end target object between the first terminal and the network device, and the target object of the sidelink interface to the network device;

or wherein after determining the mapping relationship between the target object of the sidelink interface and the target object of the backhaul link, the method further includes:

transmitting the mapping relationship between the target object of the sidelink interface in the uplink direction and the end-to-end target object between the first terminal and the network device to the first terminal; or transmitting the mapping relationship among the target object of the backhaul link in the uplink direction, the end-to-end target object between the first terminal and the network device, and the target object of the sidelink interface to the first terminal.

11. The information transmission method according to claim 1, wherein before determining the mapping relationship between the target object of the sidelink interface and the target object of the backhaul link, the method further includes:

receiving a sidelink interface PC5-S connection establishment request sent by the first terminal, and establishing a PC5-S connection with the first terminal, wherein the establishing the PC5-S connection comprises one of the following:

establishing the PC5-S connection using a PC5-S message dedicated to a relay system; or, adding indication information to the PC5-S connection establishment request message, wherein the indication information is used to indicate that a purpose of establishing the PC5-S connection is to request the second terminal to serve as a relay from the first terminal to the network device.

12. The information transmission method according to claim 1, wherein before determining the mapping relationship between the target object of the sidelink interface and the target object of the backhaul link, the method further includes:

determining that data and/or control information of the first terminal are transmitted on the backhaul link using a default target object of the backhaul link.

13. An information transmission method, applied to a second terminal, comprising:

determining a mapping relationship between a target object of a first sidelink interface and a target object of a second sidelink interface;

performing information transmission between a first terminal and a third terminal according to the mapping relationship;

wherein the target object is one of a bearer, a radio link control (RLC) channel and an RLC layer logical channel;

the second terminal is a relay terminal for communication between the first terminal and the third terminal;

the target object of the first sidelink interface is a target object of a sidelink interface between the first terminal and the second terminal;

the target object of the second sidelink interface is a target object of a sidelink interface between the second terminal and the third terminal;

wherein after determining the mapping relationship between the target object of the sidelink interface and the target object of the backhaul link, the method further includes:

transmitting a mapping relationship between the target object of the backhaul link in the downlink direction and the end-to-end target object between the first terminal and the network device to the network device; or transmitting a mapping relationship among the target object of the backhaul link in the downlink direction, the end-to-end target object between the first terminal and the network device, and the target object of the sidelink interface to the network device.

14. The information transmission method according to claim 13, wherein before the determining the mapping relationship between the target object of the first sidelink interface and the target object of the second sidelink interface, the method further includes:

receiving configuration information of an end-to-end target object between the first terminal and the third terminal and configuration information of the target object of the first sidelink interface sent by the first terminal;

determining configuration information of the target object of the second sidelink interface according to the configuration information of the end-to-end target object and configuration information of the target object of the first sidelink interface.

15. An information transmission method, applied to a first terminal, comprising:

determining configuration information of an end-to-end target object between the first terminal and a third terminal;

determining configuration information of a target object of a first sidelink interface according to the configuration information of the end-to-end target object;

transmitting the configuration information of the end-to-end target object between the first terminal and the third terminal and the configuration information of the target object of the first sidelink interface to a second terminal;

wherein, the target object is one of a bearer, a radio link control (RLC) channel and an RLC layer logical channel;

the target object of the first sidelink interface is a target object of a sidelink interface between the first terminal and the second terminal;

the second terminal is a relay terminal for communication between the first terminal and the third terminal;

wherein after determining the mapping relationship between the target object of the sidelink interface and the target object of the backhaul link, the method further includes:

transmitting a mapping relationship between the target object of the backhaul link in the downlink direction and the end-to-end target object between the first terminal and the network device to the network device; or transmitting a mapping relationship among the target object of the backhaul link in the downlink direction, the end-to-end target object between the first terminal and the network device, and the target object of the sidelink interface to the network device.

16. The information transmission method according to claim 15, wherein after determining the configuration information of the target object of the first sidelink interface according to the configuration information of the end-to-end target object, the method further comprises:

dividing a QoS parameter of an end-to-end target object between the first terminal and the third terminal, between the target object of the first sidelink interface and a target object of a second sidelink interface;

wherein the target object of the second sidelink interface is a target object of a sidelink interface between the second terminal and the third terminal.

17. A terminal, being a second terminal, comprising: a memory, a processor, and a program stored on the memory and executed by the processor; the processor executes the program to implement the information transmission method according to claim 1.

18. A terminal, being a second terminal, comprising: a memory, a processor, and a program stored on the memory and executed by the processor; the processor executes the program to implement the information transmission method according to claim 13.

19. A terminal, being a first terminal, comprising: a memory, a processor, and a program stored on the memory and executed by the processor; the processor executes the program to implement the information transmission method according to claim 15.

\* \* \* \* \*